US011682027B2

(12) United States Patent
Metcalf

(10) Patent No.: US 11,682,027 B2
(45) Date of Patent: Jun. 20, 2023

(54) SYSTEM AND METHOD FOR EXPEDITING FULFILLMENTS OF ONLINE ORDERED DELIVERABLES BY EXPEDITED-SERVICE AREA PICKUPS IN SPECIFIED TIME-WINDOWS AND BY DELIVERY TO SPECIFIC LOCATIONS

(75) Inventor: Darrell Metcalf, Fillmore, CA (US)

(73) Assignee: EXPEDITED DUAL COMMERCE LLC, Austin, TX (US)

( * ) Notice: Subject to any disclaimer, the term of this patent is extended or adjusted under 35 U.S.C. 154(b) by 1396 days.

(21) Appl. No.: 12/262,007

(22) Filed: Oct. 30, 2008

(65) Prior Publication Data
US 2009/0048878 A1    Feb. 19, 2009

Related U.S. Application Data

(63) Continuation of application No. 09/617,156, filed on Jul. 17, 2000, now abandoned.
(Continued)

(51) Int. Cl.
*G06Q 30/02* (2012.01)
*G06Q 10/02* (2012.01)
(Continued)

(52) U.S. Cl.
CPC ............. *G06Q 30/02* (2013.01); *G06Q 10/02* (2013.01); *G06Q 10/0637* (2013.01); *G06Q 30/0601* (2013.01); *G06Q 50/12* (2013.01)

(58) Field of Classification Search
CPC .... G06Q 30/02; G06Q 10/02; G06Q 30/0601; G06Q 10/0637; G06Q 50/12
(Continued)

(56) References Cited

U.S. PATENT DOCUMENTS

| 5,250,789 A | 10/1993 | Johnsen ........................ 235/383 |
| 5,319,542 A | 6/1994 | King et al. .................... 364/401 |

(Continued)

FOREIGN PATENT DOCUMENTS

| CN | 1079320 A | * 12/1993 | ........... G06K 7/1093 |
| CN | 1170178 A | * 1/1998 | ............... G08G 1/01 |

(Continued)

OTHER PUBLICATIONS

Jordan, C.W. "Zephyr: A Secure Internet-Based Process to Streamline Engineering", Nov. 1-5, 1997, WebNet World Conference, pp. 1-12. (Year: 1997).*
(Continued)

*Primary Examiner* — Tan D Nguyen
(74) *Attorney, Agent, or Firm* — Dana Legal Services; Jubin Dana

(57) ABSTRACT

A system and method for expediting fulfillments of online ordered dual-commerce available deliverables, by a customer of one or more expedited service areas (ESAs) where a sequenced deliverable pickup fulfillment or procurement access is provided within a specified time-window, and/or by delivery fulfillments made to specific locations, as selected in a graphical user interface (GUI) present in a display screen of a personal wireless communication (PWC) device or handheld PWC device. ESAs including designated ESAs are located within, adjacent, or nearby, respective deliverable provider networked-venues (DPNVs) and provide deliverable pickup fulfillments or procurement access more quickly to scheduled ESA-visit customers than DPNVs provide to non-ESA customers. The GUI may present browsing of deliverables of a DPNV available for online ordering, purchasing and either or both dual-commerce fulfillments; an itinerary or schedule including one or more ESA-visit time-window(s); navigational instructions and/or
(Continued)

contextual-prompts facilitating a customer's ESA fulfillment(s).

131 Claims, 5 Drawing Sheets

Related U.S. Application Data

(60) Provisional application No. 60/144,210, filed on Jul. 19, 1999.

(51) Int. Cl.
| | | |
|---|---|---|
| *G06Q 30/06* | (2012.01) | |
| *G06Q 10/06* | (2012.01) | |
| *G06Q 50/12* | (2012.01) | |
| *G06Q 30/0601* | (2023.01) | |
| *G06Q 10/0637* | (2023.01) | |

(58) Field of Classification Search
USPC .......................................................... 705/1.1
See application file for complete search history.

(56) References Cited

U.S. PATENT DOCUMENTS

| | | | | |
|---|---|---|---|---|
| 5,615,121 | A | 3/1997 | Babayev et al. .............. 395/209 |
| 5,649,114 | A | 7/1997 | Deaton et al. ................ 395/214 |
| 5,758,327 | A | 5/1998 | Gardner et al. ................ 705/26 |
| 5,850,446 | A | 12/1998 | Berger et al. ................... 380/24 |
| 5,874,897 | A * | 2/1999 | Klempau .............. A61B 5/1112 |
| | | | | 340/573.1 |
| 5,887,269 | A | 3/1999 | Brunts et al. ................ 701/208 |
| 5,918,213 | A | 6/1999 | Bernard et al. ................. 705/26 |
| 5,948,040 | A * | 9/1999 | DeLorme et al. ............ 701/426 |
| 5,960,411 | A | 9/1999 | Hartman et al. ............... 705/26 |
| 5,963,948 | A | 10/1999 | Shilcrat ............................ 395/12 |
| 5,978,770 | A | 11/1999 | Waytena et al. |
| 5,999,914 | A | 12/1999 | Blinn et al. ..................... 705/26 |
| 6,009,413 | A | 12/1999 | Webber et al. ................. 705/26 |
| 6,026,375 | A | 2/2000 | Hall et al. ....................... 705/26 |
| 6,040,829 | A | 3/2000 | Croy et al. ..................... 715/864 |
| 6,101,482 | A | 8/2000 | DiAngelo et al. ............. 705/26 |
| 6,125,352 | A | 9/2000 | Franklin et al. ................ 705/26 |
| 6,125,353 | A | 9/2000 | Yagasaki ........................ 705/27 |
| 6,131,087 | A | 10/2000 | Luke et al. ..................... 705/26 |
| 6,154,738 | A * | 11/2000 | Call ..................... G06Q 20/201 |
| | | | | 705/20 |
| 6,157,841 | A | 12/2000 | Buldec et al. ................ 455/457 |
| 6,405,100 | B1 * | 6/2002 | Christ .......................... 700/216 |
| 2001/0011232 | A1 * | 8/2001 | Peterson et al. ................ 705/26 |

FOREIGN PATENT DOCUMENTS

| | | | | |
|---|---|---|---|---|
| EP | 0772141 A2 * | 5/1997 | ............. G06Q 10/10 |
| FR | 2690598 A1 * | 10/1993 | ........... G06F 30/367 |
| JP | 11215107 A * | 8/1999 | |
| WO | WO-0028518 A2 * | 5/2000 | ......... G06F 16/9577 |
| WO | WO-0042548 A2 * | 7/2000 | ............. G06Q 30/02 |
| WO | WO-0065514 A2 * | 11/2000 | ............. G06Q 10/02 |

OTHER PUBLICATIONS

Ceder, C.J., "VHDL Board-Level Modeling to Expedite Redesign", 1996, Naval Research Laboratory, Washington, D.C 20375, pp. 200-204. (Year: 1994).*

T. Tahmassebi, "An approach to management of Multilevel Distribution Systems for consumer goods and chemicals industry under information uncertainty", 1998, Computers Chem. Engineer, vol. 22, Supple., pp. S263-S270. (Year: 1998).*

Pattie Maes, "Agents that buy and sell", 1999, Communications of the ACM, vol. 42, No. 3, pp. 81-91. (Year: 1999).*

Keough, Mark, "Buying Your Way to the top," 1993, Scholarly Journal, The McKinsey Quarterly, New York, Issue 3, 41. (Year: 1993).*

David Pyke, "Performance Characteristics of Stochastic Integrated Production-Distribution Systems," 1993, European Journal of Operational Research 68 (1993)23-48. (Year: 1993).*

* cited by examiner

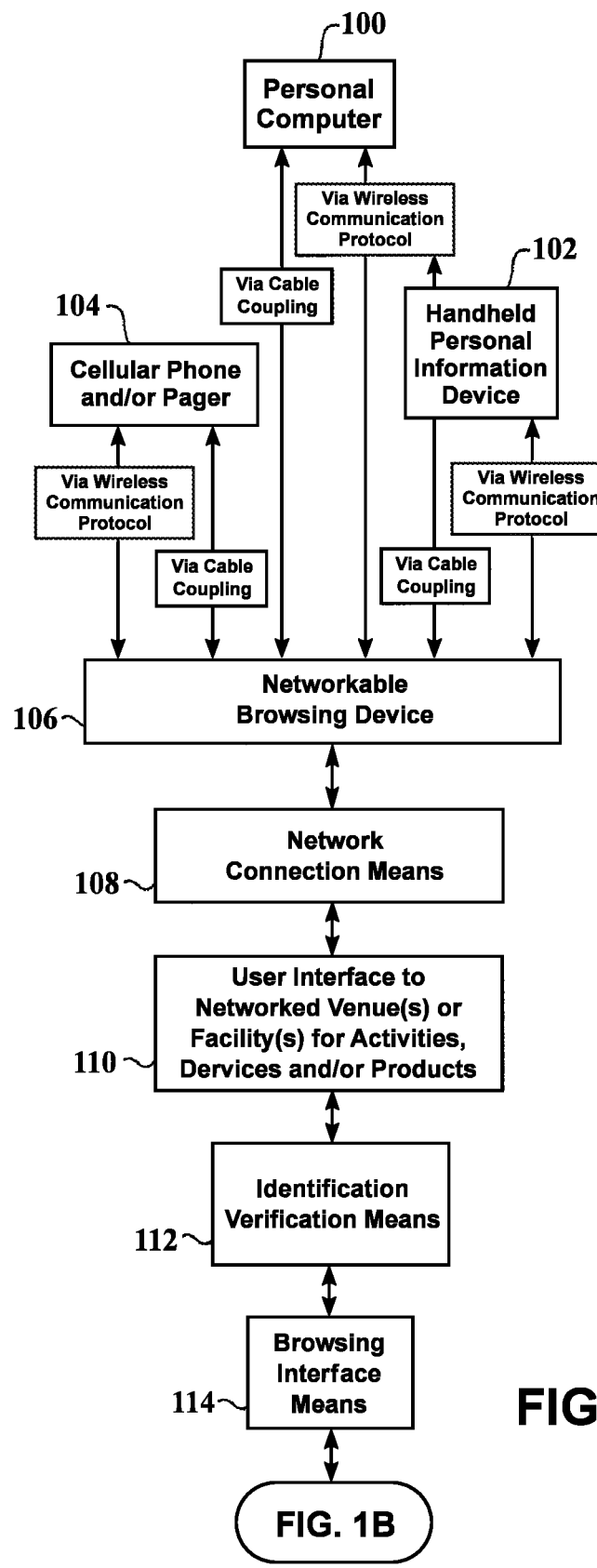

SYSTEM AND METHOD FOR EXPEDITING FULFILLMENTS OF ONLINE ORDERED DELIVERABLES BY EXPEDITED-SERVICE AREA PICKUPS IN SPECIFIED TIME-WINDOWS AND BY DELIVERY TO SPECIFIC LOCATIONS

PRIORITY CLAIM

This application is a continuation of U.S. patent application Ser. No. 09/617,156 filed on Jul. 17, 2000, which claims priority to U.S. Provisional Patent Application Ser. No. 60/144,210 filed Jul. 19, 1999, the disclosures of both of which are hereby incorporated by reference as if fully set forth herein.

BACKGROUND OF THE INVENTION

Field of the Invention

This invention is related to the field of network-facilitated commerce systems, and in particular to a system and method for expediting commerce with internet browsing apparatus and ordering, reserving and scheduling networked-computer systems to achieve a dual-commerce system and method between a large-scale network and one or more physical venues offering merchandise, services and/or activities. The system communicates via a network such as the international global network (Internet) to coordinate and automate and consolidate online transactions, or interactions, and to schedule and/or sequence reservable excursions to expedite transactions, or interactions, at any of a variety of venues, including those providing multiple points of interest, or multiple customer transactions, or interactions. The invention further pertains to venues having scalable designated 'Expedited Service Areas' at, or near to, their locations to provide scheduled transaction, or interaction, services to attendees who have—prior to their arrival at the venue-location—employed the system to order, schedule or reserve one or more venue deliverables, such as goods, services, and/or activities. In one embodiment of the invention, the browsing apparatus includes a handheld device having wireless communications capability for further enhancing attendee or customer interaction, convenience and the expediting of their schedulable visits to venues and their points of interest. The system also optimizes attendee or customer flow rates such that venue staffing can be optimally and respectively scheduled according to the degree of scheduled attendee or customer traffic at each venue.

SUMMARY OF THE INVENTION

In recent years developers of mall-based facilities and store chains have been faced with numerous challenges relating to the need to improve the customers' experience when shopping at such facilities. Often such experiences are quite frustrating, for example, due to congestion, parking difficulties, or finding out upon arriving at a venue that items are out of stock or aren't available in desired sizes, or that services or activities thought to be available before one's arrival are in fact not available when one arrives at a given venue. From a business owner perspective, other problems are prevalent. Various venues including, mall-based facilities and facilities incorporating a plurality of stores, or store-chains, have little or no means to optimize a traffic flow of customers and are often left with having to make a best-guess estimate of the number of staff personnel that will be required in a store for a given time of the week, month, or season of the year. Thus, such stores can often become either understaffed resulting in long lines and unproductive delays for their customers, or can be overstaffed which can significantly affect the profits of the business. It, therefore, would be preferable to plan and build networked-venues having the means to substantially improve the customers' and merchants' experience, to provide expedited and schedulable customer interactions at a variety of venues such as those located within malls, entertainment complexes, or other facilities offering products, services and/or activities. And to optionally do so in engaging and entertaining ways. Furthermore, it would be preferable to business owners to have some means for optimizing staffing according to a schedulable flow of expedited customer interactions within their respective stores, service centers, or other venues.

The present invention is illustrated in the context of physical venue commerce which is facilitated and expedited by a networked communication with browsing apparatus to achieve a dual-commerce system and method. The browsing apparatus communicates via a networkable connection means such as a networked connection offered by an Internet Service Provider (ISP) and employs a web-browsing software program such as Microsoft® Internet Explorer®, or Netscape Navigator®. The system provides an online software user interface such as a Web Portal (or downloadable web browsing application or interface) which communicates with network-formatted information pertaining to the availability and purchasing details of deliverables offered at one or more networked-venues. Such information is stored in computer-accessible storage means to provide customer-access to current databased data pertaining to product-related transactions, and current databased activity(s) and/or service(s) availability data for available activity(s) and/or service(s) transactions. The system's browsing apparatus, includes any of a variety of devices that are made for network browsing, including: computers; handheld personal information devices; cell phones and/or pagers; and the like. When connected to the system, the browser apparatus provides selection, ordering, and/or reservation of deliverables such as products, services and/or activities offered at one or more participating venues networked to the system. Such networked-venues can include any of a variety of product, activity(s) and/or service(s) venues such as those found at entertainment complexes, mall-based facilities, amusement parks, convention centers, stadiums, arenas, a store, or store-chain, service(s) or activity(s) facility, and the like. The system's browsing apparatus connects with an online software user interface which communicates with at least one networked-computer at each participating networked-venue. The venue's networked computer(s) and software facilitate the selection, ordering, reserving and transaction confirmation of that venue's available deliverables. Online ordering of the venue'(s) deliverables are confirmed and recorded during each customer transaction and the record-keeping data pertaining to selected and reserved deliverables are updated real-time by the software, e.g., instantly adjusting the system's databased inventory record in the case of purchased merchandise; or, instantly adjusting service(s) availability or activity(s) availability during either of such transactions. A scalable designated area, for example an "Expedited Service Area" is provided at each networked-venue's location for expediting and culminating interactions customers have reserved online. The system's software includes a reservation and scheduling means that query an updateable chronological software table of scheduled and available customer-events at networked-venues to reserve, schedule and sequence itineraries for customers whose transactions or interactions are to occur at one or more locations, or places. The reservation and scheduling means includes the means to create and adjust itineraries (whenever possible) around a customer's preferred schedule, or when a preferred schedule is not available, to provide schedules around a choice of one or more 'best-fit' (i.e. best available) itineraries. After completing and confirming one or more orders online that will be culminated at one or more networked-venues, the customer then selects the best available itinerary and the system's software provides the customer the choice to either download the itinerary, for example to be used in a wireless handheld device, or print out an itinerary record (by downloading it and printing it, or by printing it out from the Internet browser software). The schedulable itineraries provide highly convenient excursions which eliminate shopping frustrations due to congestion, parking difficulties (parking is schedulable), or finding out upon arriving at a venue that items are out of stock or aren't available in desired sizes, or that services or activities thought to be available before one's arrival are in fact not available when one arrives at a given venue.

Additionally, one or more facilities having the system's network-enabled venues . . . can also be equipped with customer interfacing means suitable for establishing a bi-directional communications link to thereby confirm customer identification (I.D.) so that further transactions or changes to scheduled sequenced steps can be made at such locations. Such interfacing means can include any one or more of a variety of known or commercially available input, or input/output (I/O) devices such as: an ATM-style interface; kiosk interface; or, other interface with one or more of the following input and/or output devices: a magnetic card-strip reader, or financial transaction card reader (e.g. for reading financial transaction card information, or credit card and/or membership card information); electronic-signature pad; a computer-interfaced keyboard, a computer-interfaced keypad, a PIN entry keypad, or wireless device transmission interface suitable for Infrared (IR) I/O, or other type of radio wave I/O (e.g., 'Blue Tooth'), and the like. With the employment of any one or more of a variety of customer interface means, the identified customer can further edit, add to, amend or reschedule itineraries. Thus a highly efficient reservation and scheduling system is provided which allows customers to conveniently move from networked-venue to networked-venue; from one point of interest to another; from one location to another; or, one place to another. For example, upon arriving at a facility equipped with the system and method of the present invention, customer itineraries (whether printed out, or downloaded into mobile handheld devices) can direct identified customers to a reserved parking spot and then to each scheduled interaction/activity and/or service. The customer is guaranteed online-reserved and confirmed orders for products, services and/or activities upon confirming their desired order and best-available itinerary, and is given the option when possible to also order deliverables online for home delivery. In the latter case, the customer is provided a means through the software of the system to shop, or order, from online representations of the deliverables of participating networked-venues, and to consolidate a plurality of such online orders from different participating venues into a one-time order procedure. It is the current practice of eCommerce sites on the Internet to require a separate 'checkout' procedure for the shopping or ordering of deliverables in different categories, for example a book purchase from an eCommerce book seller website requires a separate checkout (ordering) procedure from the purchase of flowers from a separate online florist's website. By contrast, the present invention facilitates diverse deliverables ordering from separate-but-participating online-represented venues and consolidates the plurality of orders into expedited one-time order procedures. For example, a book, a DVD, and a dress, each sold by (and shown as available) by different online sellers is consolidated into a single online invoice or receipt indicating the separate price of each deliverable and the cumulative price (and where applicable the sales tax). The system's software automatically places the order with each seller (and optionally notifies their supplier of the sale) and deducts those deliverables from the available inventory. The software tracks the scheduled customer flow-rate at any participating venue and provides an optimum/known flow of customers from which each participating venue can more accurately predict and schedule required personnel. Thus, any expedited service area can be scheduled up to 100% capacity. The Expedited Service Area designated in any given venue is also optionally scalable to allow more customer transactions and/or interactions as more customers use the system's dual-commerce services to plan and schedule their network-enabled excursions. Such scalability provides a means for venues to operate at an optimum and known (scheduled) customer flow rate without the log-jamming experienced by customers at typical venues that are operated at full, or near to full, capacity.

Customers experience the benefits of guaranteed availability of deliverables whether purchased online and consolidated into a single-entry ordering procedure (which is then delivered to their homes or places of work), or when ordered and retrieved in highly convenient, schedulable excursions from Expedited Service Areas. Merchants experience optimized customer flow and flow rates to networked-venues and more predictable staffing needs. Merchants are also sent new and repeat customers and know in advance who, when and how many customers are being sent. Many of these customers who might otherwise not have come to a conventional physical venue—and perhaps simply shopped online at a potential low-priced competitor's website—are attracted by a new customer experience offering unprecedented efficiency and time-saving convenience. Merchant's suppliers are optionally notified automatically by the system's software as to the merchants' restocking needs (e.g. by a networked order to a suppliers computer, by email, by fax, or by automated phone message, etc.).

It is the purpose of the present invention to address the shortcomings in existing and prevalent web-only commerce sites, and physical venue-only commerce, and to overcome the frustrations associated with, and experienced by, non-scheduled visitations of customers, or attendees, and to instead provide an efficient networked ordering, reservation and scheduling system for dual-commerce offering distinctive online, and physical venue customer and merchant experiences.

PRIOR ART

Several attempts have been made to provide improved customer interactions in retail environments and other physical venues, but the attempts have not been implemented in ways which were well coordinated for the customer(s) or the business owner(s), or in ways that used the power of an online network to order, reserve and schedule both online and physical venue transactions and/or interactions. The present invention consolidates ordering procedures and schedules optimal traffic flow when more than one facility, venue, or location of interest needs to be visited. By contrast, the previous methods have not implemented scheduling methods in a way that benefited both the store owner and the customer traveling between multiple venues. Additionally, they have not provided printable, or downloadable itineraries, or provided scheduling flexibility to amend, add to, or otherwise edit schedulable itineraries, transactions and/or interactions; or to download such schedules to convenient handheld devices which have various means for connectivity to a scheduling system.

From a customer perspective it has been possible to call by phone, ahead of time to arrange that a product, activity or service be reserved for pick up at a certain time. However, the customer has either done this ordering from memory, or from a static printed reference such as an ad or catalog, or from a very limited understanding of a facilities' entire offerings. Whereas, with the dual-commerce system and methods of the present invention it is possible for a customer to browse entire databased inventory(s) representing all available products, or all available services and/or activities, and to access such deliverables at one or a plurality of networked-venues, and to then schedule efficient sequenced visits (including the scheduling of reserved parking). Thus highly organized and efficient excursions to one or more venues, places of interest, malls, or complexes, and the like, are easily provided, and the inherent strengths of the Internet (or other network) to track and provide transaction accountability is employed by the dual-commerce system. Additionally, the coordinated scheduling makes it possible for store owners to enjoy network-enabled sales that send customer to the merchant's venue and to benefit from the knowledge of when such customers will arrive so that efficient staffing of the venues' personnel can also be achieved. Search of prior art has shown no systems, methods or apparatus to achieve such objects and advantages of the present invention, or its dual-commerce, order consolidating and scheduling/reservation methods including the system's capability to query an updateable software table of chronological scheduled and schedulable customer-events in order to schedule best-fit, or best available, downloadable itineraries for time-saving excursions to one or more networked-venues.

BRIEF DESCRIPTION OF THE DRAWINGS

FIG. 1A is a diagrammatical flow chart showing various browsing devices that can be linked in bi-directional communication with: a network connection means such as an Internet Service Provider (ISP); a user interface such as a browser software application e.g. Microsoft® Internet Explorer® or Netscape Navigator®; an identification means; and, a browsing/interface means such as Internet Portal, all of which provide access to at least one networked-venue.

FIG. 3 shows an interior top view of the venue's automated pick-and-place robotics and record-keeping/updateable system, which is accessible by workstation access, including one or more optional ATM-Style stations at an exterior wall adjacent near to the workstation system.

DESCRIPTION OF THE PREFERRED EMBODIMENTS

Figure 1B:
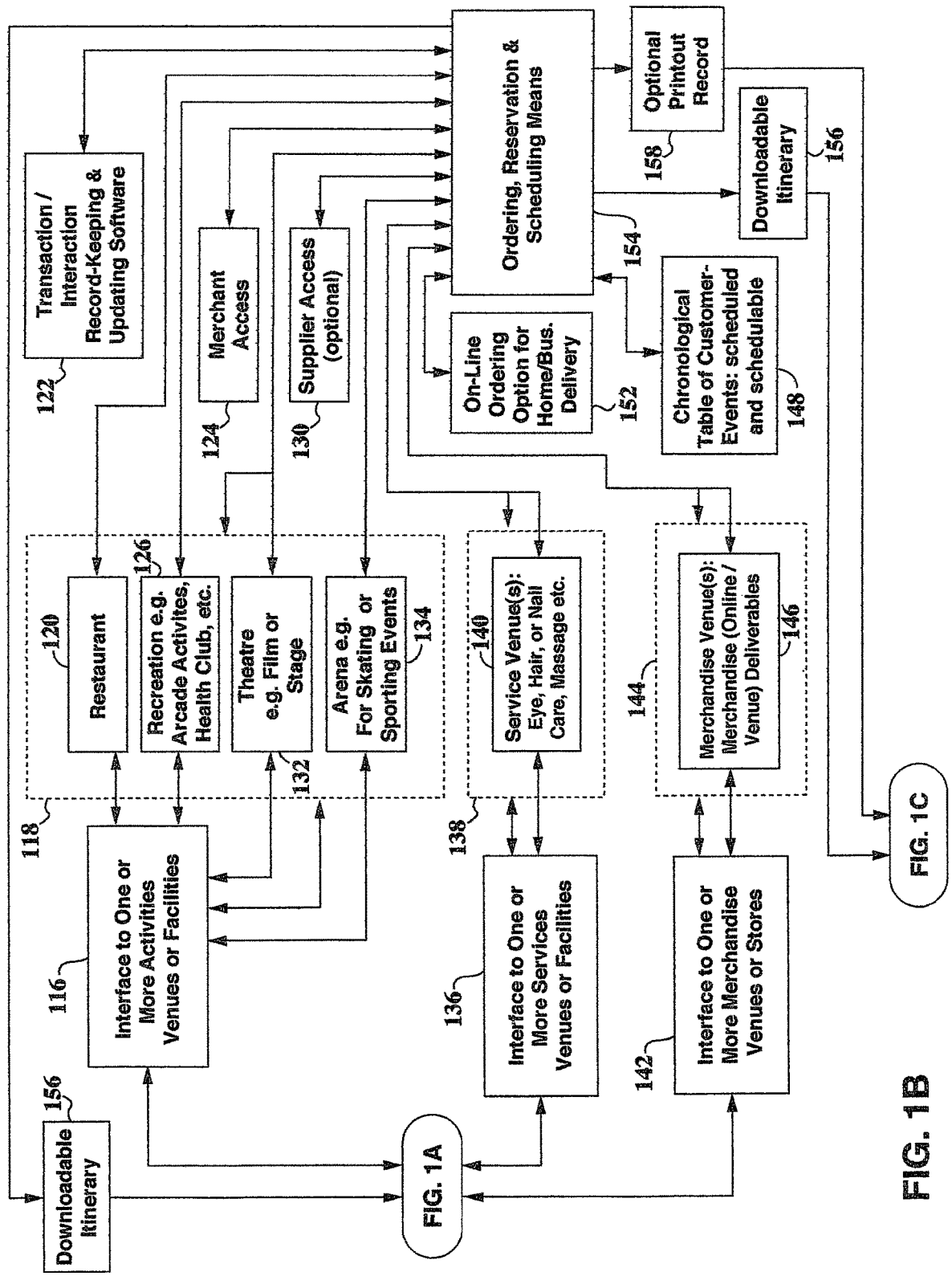
FIG. 1B is a continuation of the flow chart of FIG. 1A, whereby the browsing apparatus of FIG. 1A has bi-directionally linked communication with at least one interface to one or more activities, services and/or merchandise venue(s) and venue-condition editing, monitoring and reporting means, and an ordering, reservation and scheduling means to facilitate online ordering, home delivery of online deliverables, and to provide scheduled itineraries for the culmination of customer transactions or interactions at one or more networked-venue(s).
Figure 1C:
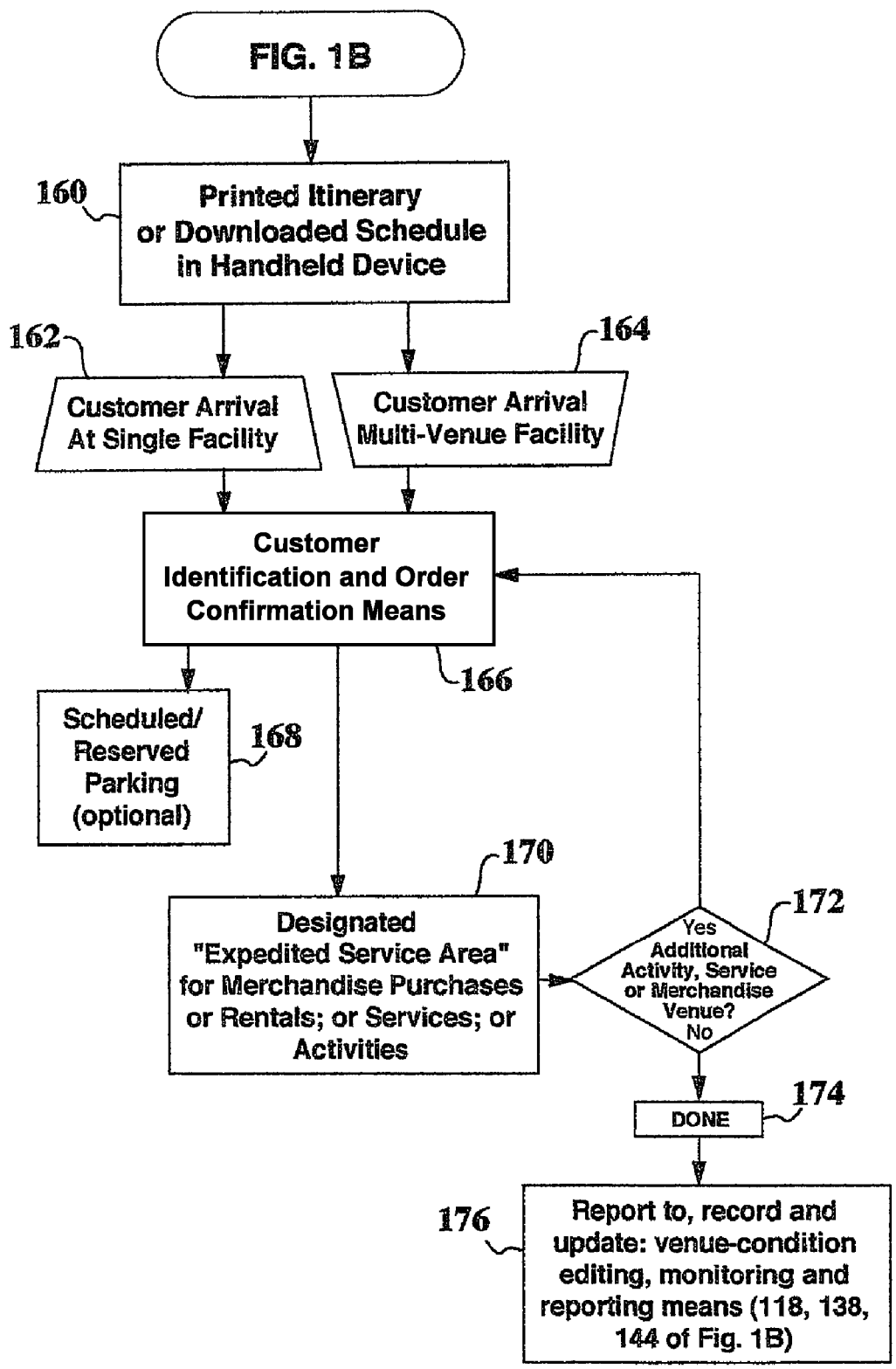
FIG. 1C is a continuation of the flow chart of FIG. 1B showing the sequence following the arrival of a customer having a printed itinerary, or alternatively a downloaded schedule in a handheld device, and his or her "Expedited" interaction with a single facility, or a multi-venue facility following customer identification and order confirmation.

FIGS. 1A, 1B and 1C collectively represent a preferred embodiment of the present invention as a dual-commerce system and method for ordering, scheduling and reservation of one or more customer transactions or interactions, and should be referred to sequentially and interchangeably to follow the descriptions below. In FIG. 1A various types of network browsing apparatus such as personal computer 100, handheld personal information device 102, and cellular phone and/or pager 104 represent one or more networkable browsing devices 106 that can be used to communicate with the system. The browsing devices have bi-directionally communication linkage via a wireless communications protocol, or via cable connections, to network connection means 108 such as an Internet Service Provider (ISP) or other provider of high-speed bandwidth connection to the Internet. Each of the browsing devices provides connection with a network such as those having an on-line protocol e.g. a transmission control protocol/internet protocol (i.e. "TCP/IP") but can alternatively be configured to connect with a variety of networks including LANs, WANs and the like. Network connection means 108 provides communication via a user interface 110 such as a web-browsing software program e.g. Microsoft® Internet Explorer®, or Netscape Navigator®. The web-browser provides communication with websites, Internet portals and the like via an identification verification means 112 such as any one or more of a variety of known software means for I.D. verification including user-entered passwords, keywords, user I.D. names, PIN numbers, and the like. Following I.D. verification, a user is granted access to browsing/interface means 114 such as an Internet portal or other Internet site which—continuing on to the flow chart in FIG. 1B—provides communication with one or more networked-venues via online representations of physical venues (i.e. venues having physical locations to receive and serve customers). Browsing interface means 114 provides communication with: interface to one or more activities venues or facilities 116; interface to one or more services venues or facilities 136; or, interface to one or more merchandise venues or facilities 142. Interfaces 116, 136 and 142 communicate respectively with activities venue-condition editing, monitoring and reporting means 118, services venue-condition editing, monitoring and reporting means 138, and merchandise venue-condition editing, monitoring and reporting means 144. Monitoring and reporting means 118, 138 and 144 are comprised of one or more databases whose data represent current venue conditions. For example, networked-venue conditions at activities venues or facilities include data pertaining to availability, ordering, scheduling and reservation of activities at any one or more of a variety of activity networked-venues such as one or more: restaurant(s) 120;

recreation facilities 126 e.g. theme e.g. theme parks, entertainment complexes, malls, arcades, health clubs and the like; theatre(s) 132 e.g., film and/or stage; arena(s) 134 events and activities such as skating, sporting events and live shows, etc. Venue conditions at services venues or facilities include data pertaining to availability, ordering, scheduling and reservation of services at any one or more of a variety of service networked-venues 140 offering one or more schedulable services, for example: health care such as eye care, skin care, dental, acupuncture, general medical; or hair care, nail care, massage; or, travel and accommodation services such as flights, car rentals, recreational outings bookings and recreational vehicle rentals, hotel accommodations; or, training, tutoring, seminars, classes or other educational sessions, etc. Venue conditions at merchandise venues include data pertaining to the availability and ordering of merchandise, and the reservation and schedulable pickup of reserved merchandise or goods at any one or more of a variety of merchandise venues 146 offering goods for sale or rental: retail stores, store-chains, themed retail, department stores, entertainment-content stores, supermarkets, malls, strip malls, dealerships, membership clubs, concession stands, and the like.

The networked-venue conditions are stored, amended and maintained as databased data in the venue-condition editing, monitoring and reporting means (118, 138, 144) and are accessible by, and communicate with, at least one venue-type interface to provide stored and regularly-updated data pertaining to the availability, ordering, reservation and/or scheduling of online and physical venue deliverables. Such data are represented in the interface in a current databased selection from which customer choosing and ordering is facilitated—by any one or more of a variety of known online order-taking procedures. An ordering, reservation and scheduling means 154 records and stores customer-choices using transaction/interaction record-keeping & updating software 122. Means 154 also comprises one or more networked-computer having software routines for facilitating online ordering, and delivery, and for facilitating online orders that are subsequently culminated at one or more networked-venue(s)—following the scheduled arrival of the ordering customer and the verification of their identity at the physical location of each of the networked-venue(s) offering the desired transaction(s) or interaction(s).

For example, in one scenario a customer's identity is verified online and he makes several orders from a plurality of online-represented networked-venues: flowers from one store; a dress from a second store; an audio CD and DVD from a third store; a meal from a restaurant; and, theatre tickets to a movie. For the flowers, dress and entertainment media, merchandise/venue-condition editing, monitoring and reporting means 144 is accessed via merchandise interface 142 and provides a current databased selection of merchandise that is easily browsed through—being categorized by type and name of the merchandise networked-venue, and by type of product(s), product(s) parameters that typically affect buying decisions (such as prices, taxes, sizes, dimensions, colors, product age/year); product(s) currently available, and so forth. For the meal and theatre tickets, activities/venue-condition editing, monitoring and reporting means 118 is accessed via activities interface 116. For one or more services, services/venue-condition editing, monitoring and reporting means 138 is accessed via services/browser interface 136. Online deliverables and venue-based deliverables are represented by any one or more of a variety of known online and/or downloadable media such as: text, line art, graphical depictions, photos, digital video files, digital audio files, computer-storable files, faxes, email, instant messaging, and the like.

As a plurality of selections are completed, ordering data is sent to at least one ordering, reservation and scheduling means 154 which includes software routines for querying, maintaining and editing a chronological table of customer-events: scheduled and schedulable 148. Ordering, reservation and scheduling means 154 keep a running and editable tally of each customer-order. For a plurality of online orders derived from different online-represented networked-venues—i.e., orders for deliverables that will be sent for example, to a customer's home or place of business—a running tally of all orders is consolidated by one or more software routines of means 154 into a single order-entry procedure (versus separate orders for each online-represented venue) and the consolidated online order is culminated and recorded when confirmed by the customer. Ordering, reservation and scheduling means 154 retains a record of each venue providing the deliverable(s) in the consolidated order and automatically calculates and allocates revenues to the merchants providing the online orders. The system also keeps a running tally and implements a similar record-keeping procedure for the online ordering of online-represented deliverables that are subsequently obtained from networked-venues. When shopping online for deliverables available at networked-venues, the customer selects an appropriate interface (116, 136, 142) and venue-type from which to make one or more order. Thus, diverse dual-commerce ordering is facilitated: at the online-represented flower shop (networked-venue) the customer orders two dozen roses; at the online-represented dress store a size 8 mango-colored dress of a specific manufacturer is selected; at online-represented entertainment-content venue the CD and DVD are easily selected—being logically categorized by media headings typically found in entertainment-content stores (including "Hits", "Specials" alphabetized "Artists", music and film genres, and so forth); the online-represented restaurant displays menu items from which a meal is selected and ordered; the theatre displays its current schedule of available tickets to feature films and a movie is selected and ordered.

The dual-commerce system optionally provides software routines that provide previews of streaming entertainment-content such as streaming audio, or streaming video.

After choosing such deliverables from the online-represented networked-venues (in this example products and activities), the ordering, reservation and scheduling means 154 queries chronological table 148 to determine one or more best-fit schedules available for time-saving excursions to the expedited service areas offered in each networked-venue. Optionally, means 154 can also query the customer for preferred time-windows during which he may wish to arrive and remain at one or more networked-venues. In the present example, the customer chooses late Friday or Saturday afternoon with the meal to begin approximately at 6:30 PM and the movie as soon thereafter as possible (Saturday is his specified preference). Means 154 contrasts the customer's preferred schedule(s) against the table of currently scheduled and available customer-events and provides a best-fit choice of available itineraries based on the most efficient and most convenient sequencing of the chosen customer-events (e.g. sequencing those events in a schedule requiring the least amount of the customer's time). Using the 6:30 meal time, the ordering, reservation and scheduling means 154 queries table 148 and finds a 6:15 time slot available on Saturday. Means 154 quickly scans the availability at other venues and proposes the following itinerary:

the flower and dress shops are nearest one another so they are scheduled for customer expedited service in a time-window between 6:00-6:15; the entertainment-content store and theatre are next to the restaurant so the CD/DVD pick-up time-window is 7:00-7:15 with the film starting at 7:15 PM. So in less than an hour and fifteen minutes, the customer can eat a meal, 'shop' at three stores and begin watching his choice of a movie. If schedules seem too tight for comfort, the customer can request the system to expand the schedule duration, e.g. the one fifteen minute schedule can be expanded (as available) to 2 hours.

Thus a plurality of online orders can be consolidated by the system into a single online entry-form (and deliverables are then sent for example, to a customer's home or business), and a plurality of orders retrievable from networked-venues is consolidated by the system into a single itinerary which facilitates the culmination of the orders at the venues. The applicant of the present invention calls these dual-commerce advantages and benefits "Web Assisted Retail Purchasing™" and uses the acronym WARP™ to explain how customers can now experience WARP-Accelerated shopping.

As mentioned, the customer chooses and confirms his itinerary and selects a printout record 158 or downloadable itinerary 156 which can be downloaded to a computer for subsequent printing or downloaded to a portable apparatus such as a commercially available handheld wireless device. It is noted that although the present example illustrates the sequencing of customer-events that will be culminated at a plurality of chosen networked-venues, it is also possible to simply schedule and reserve a customer transaction and/or interaction at a single networked-venue. For example, in FIG. 1C a printed itinerary or downloaded schedule 160 can direct the customer to a single facility 162, or in the case of the example given above, to a multi-venue facility 164. In either case, a customer identification and order confirmation means 166—such as any one or more of a variety of known identification and order confirmation apparatus (including wireless bi-directionally linked confirmations, electronic signatures, the combination of financial transaction cards and card magnetic strip readers, and so forth)—precedes scheduled parking 168 (optional) and his transaction and/or interaction at a designated expedited service area 170. Such designated areas are within, adjacent to, or near to, the networked-venues. The designated expedited areas are so marked and are easily discernible to the customer, and are staffed by personnel according to the flow of 'expedited' customer interactions that have been scheduled before the customer's arrival.

Each culminated order is automatically reported back—via one or more order-reporting software routines—to the relevant venue-condition editing, monitoring and reporting means (118, 138, 144) via reporting step 176. Additional transactions and/or interactions 172 (by the same customer) at other networked-venues are handled by one or more software routines which track, record and tally subsequent use of customer identification and order confirmation means 166 and/or subsequent transaction and/or interaction at a respective designated expedited service area 170 of such networked-venues. When the customer is done 174, the cumulative transactions and/or interactions are reported to one or more venue-condition editing, monitoring and reporting means (118, 138, 144) via reporting step 176. The report is also routed to ordering, reservation and scheduling means 154 to adjust the availability of schedules in chronological table 148 and transaction/interaction record 122 which additionally calculates, records and reports revenues and/or commissions for each transaction/interaction and does so according to the types of purchases made. Customer orders, reservations and schedules (and relevant data pertaining thereto) are also communicated to merchants via merchant access 124 as orders are made and confirmed. Optionally merchants can choose to have one or more suppliers automatically notified of each sale, or when merchant-configurable restocking thresholds are reached.

In one embodiment of the invention, the system can optionally accommodate real-time requests for itinerary breaks when the customer is using, or about to use, an itinerary. For example, customers may wish to rest or take an unscheduled detour. In such cases, ordering, reservation and scheduling means 154 queries and adjusts schedules as available in chronological table 148 and reports schedule options to the customer for his or her choosing via a customer's portable communications device such as wireless personal digital assistant ('PDA'), or via a venue-based itinerary-displaying and/or printing system (e.g., one or more networked computer and coupled printer, not shown). In larger venues such as amusement parks, or theme parks, means 154 simply swaps break requests between a plurality of customers and re-schedules customer-events as available. For example, in the following scenario, it's 11:20 AM, 'customer A' has two events scheduled between 11:30 AM and noon but has just made a half hour break request at a networked-venue computer, and 'customer B'—who has a half hour break scheduled between 11:30 AM and noon and the same two events as 'customer A' scheduled a half hour later (noon to 12:30 PM)—now wishes to prioritize the scheduled events before his break and he uses the Internet connectivity of his wireless device to make his request. The system easily accommodates both customer's wishes by buffering all pending requests while querying changes and current conditions in chronological table 148. One or more software routines compare the scheduled data and requested changes and—in the example of 'customer A' and 'customer B' instantly swaps those customers requested breaks with their previously scheduled events.

Thus a highly efficient, flexible dual-commerce system offering both conventional online ordering and delivery 152 and the improved convenience of schedulable itineraries to one or more networked-venue(s) is provided. The merchants of the networked-venues receive customers that the system sends them—customers who might otherwise have simply shopped online if not for the new customer experiences being offered, including added-value time-saving convenience and same-day availability of deliverables at networked-venues. No waiting in long lines or wondering if desired goods, activities or services, will be available (including in the right size, model, shape, color, etc.). The system ensures availability of, and reserves, the customers' transactions and/or interactions at all participating networked-venues. The customer passes quickly from expedited service area to expedited service area using a minimum of time, and schedule changes are easily accommodated. The system also creates a seamless economy whereby customers and merchants receive current online and venue-condition status, commissions are automatically calculated for all orders and, optionally suppliers are automatically informed as to the restocking needs of networked-venues. Furthermore, the customer can pre-pay all orders online, meaning that little or no cash need be carried by the customer to networked-venues, which is an added security benefit.

In another embodiment of the present invention, the designated area for expedited service includes the incorporation of any one or more of a variety of known receivers or transceivers of wireless transmissions suitable for communications with the type of wireless devices mentioned above. Expedited service areas can also include magnetic card strip readers for customer identification and order confirmation purposes. In either case, the facility's wireless devices or transceivers, or card readers, are employable as an efficient and quick verification means of the expedited-customer's identification, order information, price confirmation, and other expedited service advantages. Additionally, handheld devices having screens that are easily readable, can optionally be equipped with machine readable code that is suitable for downloading and displaying scheduled itinerary information which is received from the Internet, or from wireless transceivers (or received when temporarily coupled to a computer). For example, the customer's sequenced itinerary can be displayed as a running or real-time updateable schedule on the screen display of his or her device and can include automated, or user-configurable prompts that occur minutes ahead of any given event. For instance, "Dinner in ten minutes", "CD pickup available in 20 minutes", "The film starts in 45 minutes", and so on. Bi-directional interactions of wireless devices facilitate quick 'checking in' at each venue and can include software to automatically update display-screen data and check-off and/or hide listed events when orders or events are completed, and/or provide useful information as to the next stop on one's itinerary. For example, the screen may read "Your next stop is on level two on the opposite side of the mall, you're currently here on level one", "Your car is parked in section B3, to exit, go to the opposite end of the mall and proceed down the escalator one level". Handheld devices equipped with a graphical user interface ('GUI') and schedule-displaying software can graphically or pictorially represent such instructions in virtually any type of facility including: a mall, entertainment complex, amusement park, convention hall, stadium, arena, and the like, using photographs, diagrams, maps, or other graphical depictions and can direct its user with graphical elements such as arrows to indicate which way he or she should proceed relative to their current position, and relative to their desired destinations in their expedited excursion (itinerary).

In the event that the handheld device also includes, or optionally provides, direction-finding hardware and software, for example 3-Com's PalmPilot® can be equipped with a Global Positioning System (attachable accessory), the device can be equipped with software for displaying destinations relative to the current location of the customer and show the customer—for example with a directional arrow relative to a graphically depicted map—which way to go relative to their current position and one or more destinations in their scheduled itinerary.

Some handheld devices also include audio capability, in which case directions by audio-equipped devices can be given audibly, as can current schedule information, which would be very useful for the visually impaired. It is noted that such navigating features would be particularly helpful in large area venues or complexes, including amusement parks, stadiums, arenas, fairs, or large conventions, and the like, where becoming geographically disoriented can easily occur. Thus one's movement from one place to another (a facility, an attraction, a booth, the aisles of a market or store, and so on) can be logically and efficiently sequenced by the apparatus of the present invention. Additionally, navigation with a graphical user interface assisted by a GPS further expedites one's sequenced excursion while optionally providing timing information as to estimated travel-time, walking or waiting time, relative to a particular point of interest, facility, attraction, booth, and the like.

Other benefits are achieved with the aforementioned GUI and/or audio capable devices such as employing graphical and/or audio messaging that is instructive and/or entertaining and engaging. As the speed, LCD displays and memory capabilities of such devices improve, it will be practical to add audio and/or video clips (whether resident in the unit, downloaded therein, or played as 'streaming' files—as communications bandwidth permits), including the use of famous clips and quotes from multimedia sources such as film libraries, cartoon libraries, or audio recordings, any of which can be chosen by the user according to the user's tastes and are selectable by the user from a database of various themes, personalities, actors, comedians, musicians, performers, athletes, leaders, politicians, and other famous figures. Such clips and/or recordings are also employable (through the employment of software routines) in a manner that makes sense in the context of, and is synchronous with, the customers' transactions, interactions and scheduled itinerary—and can also include entertaining media and recordings (whether related to their transactions or not) that can be played back on their handheld device. For example, a comedic clip might say "I'm trying to think but nothing happens" as a user is waiting for access to a particular piece of information.

Figure 2:
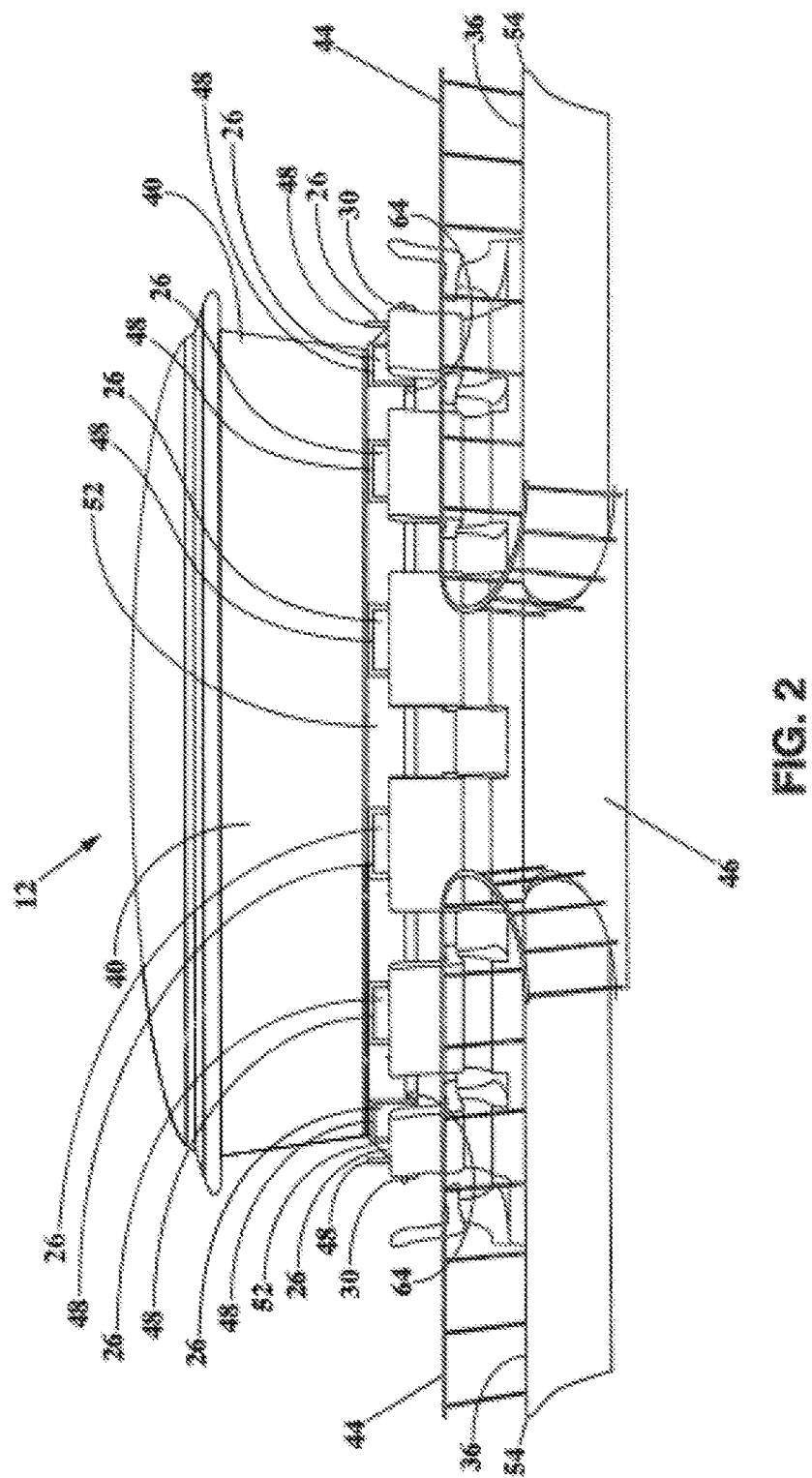
FIGS. 2 and 3 are front views and top views respectively of an optimized networked-venue having a plurality of networked workstations which securely encircle an inventory of merchandise in a workstation system.
Figure 3:
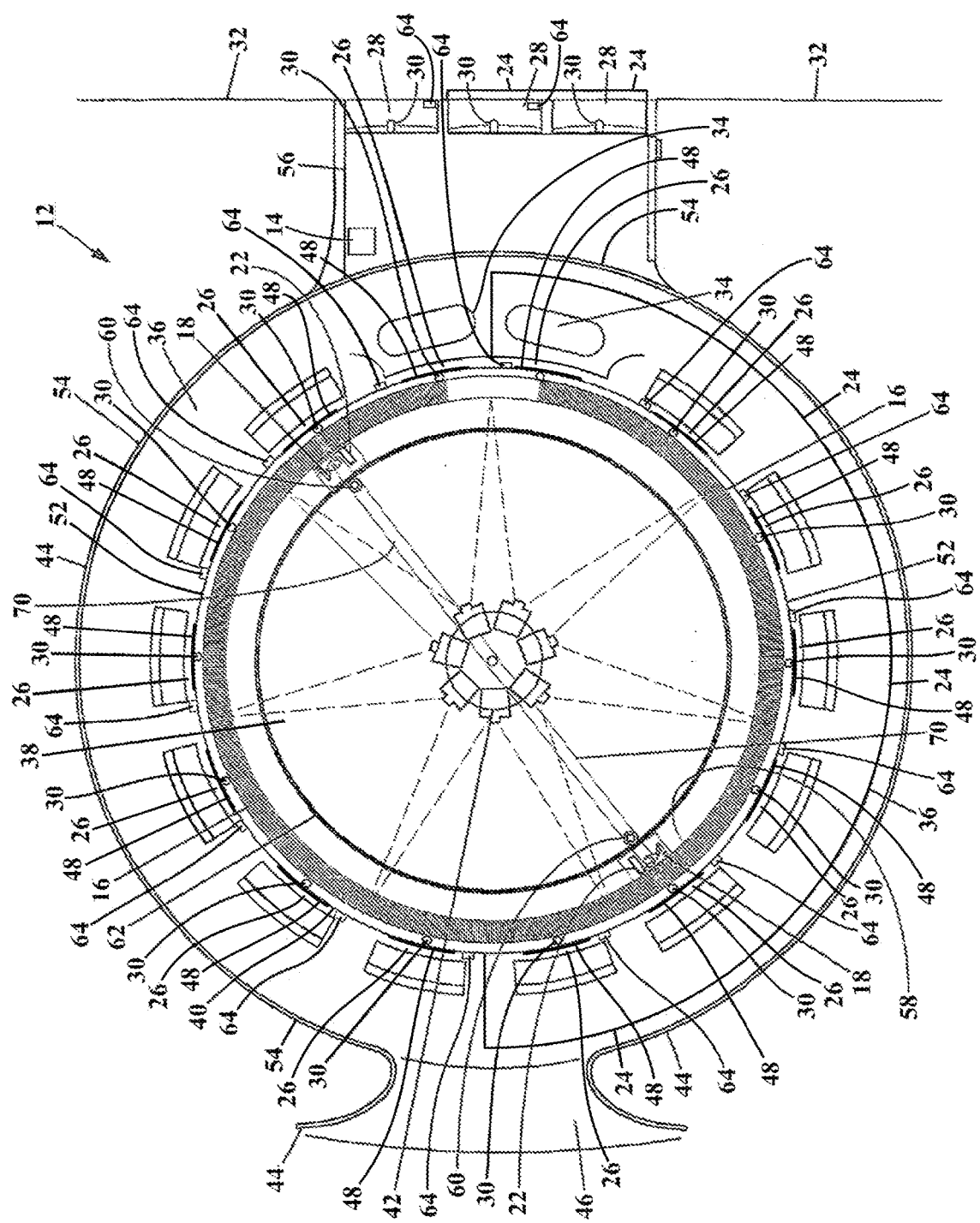

FIGS. 2 and 3 are front views and top views respectively of an optimized networked-venue having a plurality of networked workstations which securely encircle an inventory of merchandise as a workstation system. FIG. 3 shows an interior top view of the venue's automated pick-and-place robotics and record-keeping/updateable system, which is accessible on-line and by workstation access, including one or more optional ATM-Style stations at an exterior wall adjacent near to the workstation system.

By way of example, FIGS. 2 and 3 depict an embodiment of the invention which is further comprised of a networked-venue workstation system 12 representing an optimized networked-venue. Workstation system 12 has a plurality of workstations 26 that serve as customer ordering bays from which in-store products can be ordered and automatically retrieved. As seen in FIG. 3 a plurality of networked workstations 26 are arranged to encompass and secure an inventory of merchandise 16 within workstation system 12 such that the inventory is out of reach to customers until purchased—thus eliminating the need and costs for individual entertainment-content security apparatus and store-wide tag detection electronic security systems. The workstations are each comprised of a networked computer/graphical user interface and display 48, with each computer thereof providing connectivity to the Internet and to a customer I.D. and ordering confirmation means 64 including transaction and interaction software routines of the types previously described in reference to FIG. 1B. Whether employed in a mall-based facility, or an independent store-chain facility, workstation system 12 is optimized for automated record updating of inventory and order information, providing both remote networked access and local access (e.g. in-store) via a networked interface to one or more merchandise venues 142 employing the methods previously described in reference to FIG. 1B.

The workstation system is further comprised of one or more designated areas 24 (FIG. 3) such as an 'Expedited Service Area' for expedited customer interactions, and optionally includes the location of one or more ATM-Style bays 28 located adjacent to an external wall of the facility—including one or more of the external bays also having an expedited transaction designated area 24. The bays have cable coupling, or wireless communication with, at least one networked computer 14 having venue-condition editing, monitoring and reporting means 144 of the type previously described in reference to FIG. 1B. The customer identification and order verification means 64 of the workstation/ordering-bays can also be configured to provide wireless transceivers and/or financial card strip readers to expedite transactions. Optionally entertaining and engaging audio and/or visual clips that help facilitate user interaction can also be employed. Like the multimedia clips and recordings employed by the handheld devices, multimedia use at the workstations can also expedite and improve the user's shopping experience—such that entertaining clips make sense in the context of the user's transactions and are entertaining, and optionally configurable to the user's taste. Thus, the workstation interface can appear to be talking to and/or instructing the customer by employing a contextual sequencing of appropriate clips or recordings relating to their current interactions and relative to their transactions. Additionally, the user can be provided with a diverse library of multimedia files to pre-select desirable personalities (e.g. famous, notorious, dysfunctional, comedic etc.), themes, scenes, songs, song clips, and so forth, and can be selected when the system is accessed remotely, or while being operated from an ordering-bay. It is noted that although the emphasis in the previous description has been on commerce and in particular dual-commerce as it pertains to workstations in a designated expedited service area, it is also noted that workstations in non-designated areas provide similar functionality and are of service to regular walk-in customers.

The external ATM-Style bays 28, provide up to 24 hour per day automated transactions for example, when used in conjunction with the pick-and-place robotics of the workstation system 12 (as depicted in FIG. 3) bays 28 can be used to retrieve purchases or rentals, and for the return and re-stocking of the latter, around the clock.

FIG. 2 is a front view of the workstation system 12, the workstations 26 are accessible via a ramp 46 leading to an elevated walkway 36 having a handrail 44 extending upward from an outer perimeter of the walkway. Each workstation has a networked computer/graphical user interface and display 48 providing a user interface to facilitate a selection, ordering and/or retrieval of inventoried goods (16 of FIG. 3) secured within an inner diameter of the annular structure 52 supporting the walkway and workstations. Each workstation is equipped with a customer identification and order verification means 64 such as a wireless transceiver that can communicate with a customer's handheld device, or a magnetic card strip reader. It is noted that by inventorying the goods, such as audio CDs, DVDs, CD-Roms, Video Games, Videos and the like, within the annular structure, that customers will not have access to any of the stock until it is ordered and paid for. Thus shoplifting is eliminated as are the substantial security costs associated with securing such valuable goods. For example, it is not uncommon for stores having a significant volume of such media, to pay in excess of $100-200K in security related equipment, which provides no added-value to the consumer in terms of their shopping experience. Often stores must also employ full-time security personnel to thwart or discourage shoplifting—adding the expense of their salaries to the security overhead. Furthermore, stores utilizing plastic CD security-locks on media have to replace those locks every few years due to damage and scuffing, and the process of removing the locks significantly slows down customer transactions. By contrast, the methods employed in FIGS. 2 and 3 eliminates the security concern by securely enclosing the inventory (out of sight) and uses the resource of security monies formerly required to add enhancements to the customer-experience.

All available in-store inventory is clearly shown and easily browsed through on the workstation display and selectable by customers at the workstation via one or more computer-coupled or computers communicating input device (i.e., goods representation and ordering are similar to product browsing and ordering functionality provided by eCommerce websites). When the networked-venue is of a type that provides entertainment-content the dual-commerce system optionally provides: software routines for streaming entertainment-content such as streaming audio, or streaming video; and computer-accessible playback means for previews of other digitally-recorded content (such as CDs, DVDs, and files stored in non-volatile memory and/or hard disk-based devices). Such computer-automated browsing of current inventory eliminates the hunting of product that may or may not be available down any number of aisles in a conventional store. If stock is not available for on-screen ordering and immediate retrieval, the customer is offered automatic delivery as soon as it is available.

An example of re-directing investment and constructively using the monies formerly required for security and security overhead, is the employment of an immersive and dynamic 360 degree screen 40 which is positioned adjacent to the upper edge of the annular structure 52 such that rear-projection images can be panoramically or segmentally projected onto the screens by a ring of projectors 42 (seen in FIG. 3) including live images from remote locations and/or pre-recorded images. The panoramic or segmented screen content is dynamic and engaging to passersby and workstation customers and produced to heighten the customers experience. Optionally, for increased security and/or enhanced customer engagement, workstation cameras 30 can be provided for interactive participation with other customers, including interactivity with customers at similar facilities located elsewhere and the imaging of such interactions on the screen 40.

FIG. 3 is a top view showing an interior detail of the workstation system 12 depicted in FIG. 2. Adjacent to an outer perimeter 54 ramp 46 can be seen at the leftmost portion of the illustration which leads to a walkway 36 surrounded by handrail 44—both of which generally encircle an annular structure 52 supporting workstations 26 (seen in FIG. 2). Adjacent to an opposite segment of outer perimeter 54 is enclosed corridor 56 leading to external wall 32. Wall 32 has one or more ATM-Style ordering bay 28 which can also be equipped with a security camera 30. Like the workstations 26, bays 28 are also interactive and provide access to the robotic pick-and-place apparatus 18 and facilitate customer interaction and transactions 24 hours per day, including purchases, rentals and rental returns. In an interior area 38 within the annular structure 52 is a secured inventory of goods 16. The scale of the depicted workstation system is such that the inventory is retained within approximately a thirty foot diameter making its storage capacity about 40,000 CD-sized CD, DVDs, CD-ROMs, and the like. Each storable item is given its own storage slot (not shown) having a position (height and radial position) that is assigned during stocking and maintained by a workstation networked device and transaction/interaction record-keeping & updating software 122.

From the top view of FIG. 3 it can be seen that any one or more of the workstations 26 or bays 28 can be clearly designated for expedited-customer interaction for example, by easily readable workstation indicia, or coloring, etc., and that such areas can be scalable to include more workstations in the designated area to accommodate increases in scheduled customers. Additionally, if the area is designated by rope/stanchion boundary, such a perimeter is flexible enough to expand and contract a designated area as needed according to an ebb and flow of scheduled customers. Additionally, horizontal workstation pads 34 can be provided for otherabled individuals' access to workstations, for example those arriving in a wheelchair. At the end of robotic arm(s) 70 a pick-and-place means 18 is shown which is suitable for placing goods in any one of a plurality of location-specific merchandise slots 58 among an entire inventory of goods. Similarly, pick-and-place means 18 is configured to retrieve goods from location-specific slots 58 as needed. In either case, such placement or retrieval of goods is done in communication with the record-keeping software and record-updateable data of the networked device, including the schedulable retrieval of goods according to the expedited-customer transactions occurring at the designated areas (i.e. workstations) of the facility. In addition to means 18 at the end of arm(s) 70, a light intensity sensing means 22 can also be employed, whereby slots that are empty reflect back light to a system-coupled, and system-communicating light emitter-detector pair that is measurably different from the light reflected by a filled slot. For instance, the interior of any empty slot can be comprised of a surface that promotes a light-reflectivity delta which is measurably different when contrasted against the light reflectivity of a filled slot. For example the interior of the slots can be flat black; or have a light-reflecting material such as light-reflective tape attached thereto which provides a brighter reflected light signal back to sensing means 22 than an occupied slot does. Goods that are stocked, retrieved, or re-stocked in a plurality of slots 58 are relationally databased according to slot height locations and slot radial locations and can be cross-referenced by any one or more of a variety of entertainment-content categories including: content title; content-genre; content-artist; content-production company, and so forth (e.g., within the record-keeping software and record-updateable data of the networked device).

In one embodiment of the optimized networked-venue, the goods can be substantially standardized in size, for example, by stocking the standard-sized media of Audio CDs, DVDs, CD-Roms, CD-Based Video Games, and so forth. In which case, the approximate 30 foot diameter rack system within the annular structure 52 of networked-workstation system 12, would contain about forty thousand units with the units stored in slot-racks approximately 8 feet high. Substantially more units can be stored when a plurality of annularly-shaped (or other-shaped) racks are employed. For example, one or more racks can be placed in an area interior to the diameter of annular structure 52 (e.g. with additional annular-shaped racks having a diameter that is less than thirty feet).

The robotic pick-and-place means 18 located at the ends of arm(s) 70 are radially and vertically positionable to any merchandise-slot 58: 1.) they are radially positionable in a horizontal axis for example by the motion-control rotation of arm 70 to desired radial slot positions relative to a predetermined 'home' position; and 2.) they are vertically positionable in a vertical axis to desired vertical slot positions by suitable vertical motion-control means such as a motion-controlled lead screw 60 which extends downward from the end of arm 70 (vertical length and travel subject to unit-rack height). Following the positioning of the pick-and-place means 18 to an alignment with merchandise in a merchandise slot, an electro-mechanically actuated gripping means is employed to grip the merchandise and move in an axis aligned with the slot until the merchandise is removed therefrom (this step is reversed for placing merchandise into a slot). The gripping means is also used when goods are delivered to a workstation, whereby the merchandise is gripped and aligned with a workstation delivery chute where it is released to slide down an incline to a merchandise reception bin accessible to the ordering customer (not shown). It is noted that the support and positioning of the pick-and-place unit(s) can be further enhanced by, suspension from above, or support from below, of an auxiliary rail system (e.g., one or more motion-controlled elements supported by rollers gliding in an aligned rail system 62). In either case, the light intensity sensing means 22 located adjacent to pick-and-place means provide real-time inventorying or regular computer-audited inventorying of the entire stock of goods as the pick-and-place means is moved. For example, during a regularly scheduled inventory such as every hour, or every shift, the computer motion control actuation of the robotic arm(s) 70 radially sweeps the sensing means 22 across each of the cumulative slots 58 of each horizontal height-row. It then vertically moves to subsequent horizontal height-rows to sweep their respective slots until the entire height of the stock has been swept/scanned. Thus, a computer-audited inventory of over forty thousand units is accomplished in less than a few minutes, upon demand or as scheduled. During normal pick-and-place activity the sensing means 22 can also be employed to verify slot occupancies and vacancies. In either case—whether scheduled, or during normal operation—databased information pertaining to the inventoried goods 18 is thereby updated, such that remote orders from a consumer's home or place of business, and local ordering (from the facility's workstations), ensures an item will always be on hand when it is shown to be among the current stock available, and can optionally be immediately ordered (for example, Just-In-Time 'JIT') from a supplier source when the stock is depleted, pre-sold (with a scheduled delay until the availability of the order), or reaches a particular unit-count threshold.

Additionally, the inventorying means can be configured to provide data to the facility's networked device that arranges inventory information in a readily understandable manner for quick and easier analysis of the inventory. For example, stock that is moving the quickest among the inventoried columns and rows can be represented pictorially on a computer display screen in unit slots that are colored in hot colors (e.g. white, yellow, orange, red). Conversely, slow-moving inventory can be represented in cool colors (blue, green, gray, black). Additionally, such data can be cross-referenced or exportable to a spreadsheet format for numerical representations, and for coordinated ordering or re-ordering of additional inventory. Either approach, whether graphical or numerical, can be further parsed to show 'aging' of stock i.e. stock that has been retained in the inventory over extended periods of time and may be removed for replacement with newer inventory.

The automated system of the optimized networked-venue illustrates, by way of example, fourteen workstations and three additional ATM-style external workstations, all of which, in effect, function as order-taking and order-fulfilling stations, meaning that the facility is optimized for the scheduling and serving of no less than seventeen customers at a time—who can quickly and easily browse on-screen represented goods, and retrieve on-screen selected goods by the system's internal robotics as desired. In contrast, a conventional entertainment-media retail and or rental facility would have to have a staff of no less than seventeen employees and seventeen cash registers to serve an equal number of customers simultaneously, and all of the stock in a conventional store would have to be secured by expensive security equipment and would have to first be hunted for by the customers (assuming desired goods are in stock). Furthermore, the condensing of the stock into the interior of the facility permits the number of goods to be securely stored within an optimized area that is one fifth of the real estate required for a conventional store having the same volume of stock. Thus, a substantial reduction in overhead is achieved by optimized networked-venues (e.g. in real estate, personnel/staffing, security staffing, inventorying, ordering, etc.). The thirty foot inner diameter optionally permits the inclusion of entertainment-content replication equipment therein, and MP3 audio file downloading systems (the system uploads ordered medialess MP3 files or other digital audio file format to medialess-file ordering customers) as network bandwidth speeds increase and medialess audio files sales increase.

FIG. 3 further illustrates the employment of a ring of projectors 42 that are positioned to project panoramic, or segmented, imagery on a screen 40 (see also FIG. 2). The content of such imagery comprises any one or more of a variety of visual-content media suitable for projection of panoramic, or segmented, images onto a projection screen. The screen further secludes the facility's inventory and provides an engaging and dynamic 'storefront' that is always changing—versus the static appearance of conventional stores. When the workstations include cameras one or more projectors 42 can project workstation customers on the screen to promote customer interactivity at one or more venue having the networked-workstation system. The screen is also ideally suited for displaying store promotions and contests, including interactive contests between customers and/or stores.

In a co-pending patent by the applicant of the present invention, various screen types and image exhibition equipment are described that are suitable for employment as the facility's screen 40.

Although the present invention has been described with a certain degree of particularity, it is understood that the present disclosure has been made by way of example, and changes in detail or structure may be made without departing from the spirit of the invention in the previous descriptions or as defined in the appended claims.

What is claimed is:

1. A method for expediting fulfillments of online ordered dual-commerce available deliverables using expedited-service area (ESA) pickups in specified time-windows and by delivery to specific locations, as selected in a graphical user interface (GUI) present in a display screen of a personal wireless communication (PWC) device, or a handheld PWC device, the method comprising:
   providing one or more merchandise deliverable provider networked-venues (DPNVs) of a physical single-venue facility or multi-venue facility, or a DPNV chain of either, open to the general public, communicatively coupled via at least one networked-computer to a communication network;
   providing by each of one or more merchandise DPNVs, a respective one or more dual-commerce available retail deliverables, available for order online for fulfillment by an at-venue scheduled pickup and by a delivery or sending to a specific location;
   allocating by the DPNV one or more designated expedited service areas (ESAs) indoors or outdoors in at least a subarea location, within, adjacent a side of, or nearby the DPNV; and for each of one or more of the ESA(s),
   a) designating the ESA, indoors or outdoors, in a manner readily discernible to customers at the DPNV,
   b) providing a standing customer or seated customer area of a size and a scheduled customer visit capacity sufficient for each of one or more customers at the ESA to receive a respective fulfillment of one or more dual-commerce available deliverables, within one of a sequence of scheduled customer event time-windows making up a flow or flow rate of scheduled ESA visit customers, and
   c) locating the ESA separate from or adjacent one or more areas allocated by the DPNV within which non-scheduled visit customers expend time due to a plurality of a search, retrieval, unavailability, not finding, lining up of one or more non-scheduled visit customers waiting to procure and/or pay for, one or more at-venue deliverables sought after, available, found and retrieved; and,
   d) including at the ESA at least one customer interface device accessible to a customer at the ESA within a specified one of a sequence of scheduled customer-event time-windows;
   providing a PWC device or a handheld PWC device accessible software user interface associated with at least one retail DPNV, operative to present in the GUI on a display of the PWC device or the handheld PWC device a representation of one or more retail dual-commerce available deliverables, available for selection in an online order of the DPNV, and based on a selecting of one or more of the deliverables, present to a user a dual-commerce choice of at least one of,
   a first dual-commerce deliverable fulfillment comprising a pickup of the selected deliverable(s) provided at a designated ESA of the DPNV within one of a plurality of customer event time-windows making up a flow or flow rate of ESA visit customers; and,
   a second dual-commerce deliverable fulfillment comprising a delivery or sending of the selected deliverable(s) to a specific location;
   determining by the at least one networked-computer, taking into account the deliverable(s) selected in the online order for a first dual-commerce deliverable fulfillment, and scheduled and schedulable customer event time-windows for ESA visits at the DPNV, at least one ESA visit time-window available for the deliverable pickup fulfillment; and
   fulfilling, the deliverable pickup fulfillment at the designated ESA of the DPNV to the customer within the computer determined time-window, upon as soon as the at least one customer interface device, verifying the identity of the customer, or the order for the dual-commerce deliverable(s), or both, at the ESA for the retail dual-commerce available deliverable(s) selected in the online order for the deliverable pickup.

2. The method of claim 1, further comprising at least a first ESA customer interface device in wireless communication with a PWC device of the customer at the ESA,
   wherein checking-in the DPNV customer for a first dual-commerce deliverable pickup fulfillment at the ESA, via the wireless communication, comprises verifying at least the identity of the customer at the ESA, or the order for the dual-commerce deliverable(s), or both, substantially at the same time of the wireless check-in, and wherein checking-in the customer wirelessly expedites a deliverable pickup fulfillment of the deliverable(s) provided at an ESA, by obviating a check-in made by one or more physical inputs and/or interactions of the DPNV customer at, and an expending of a period of time at, one or more ESA customer interface devices.

3. The method of claim 1, further comprising receiving an online pre-payment for one or more retail dual-commerce available deliverables represented in the GUI and selected in the DPNV online order, prior to a first dual-commerce deliverable pickup fulfillment of the deliverable(s) at an ESA within a specified time-window, wherein receiving the online pre-payment for the deliverable(s) prior to the pickup at the ESA, expedites a deliverable pickup fulfillment of the deliverable(s) by obviating at least one of a cash payment at the DPNV, an at-venue financial transaction at an at least one ESA customer interface device and an expending of a period of time for either transaction.

4. The method of claim 1, further comprising:
at least a first ESA customer interface device communicating wirelessly with a handheld PWC device of a DPNV customer at the ESA,
wherein checking-in the DPNV customer for a first dual-commerce deliverable pickup fulfillment at an ESA, via the wireless communication, comprises:
verifying at least the identity of the customer at the ESA, or the order for the dual-commerce deliverable(s), or both, substantially at the same time of the wireless check-in; and
receiving the online pre-payment for one or more retail dual-commerce available deliverables selected in the DPNV online order, prior to a first dual-commerce deliverable pickup fulfillment of the deliverable(s) at an ESA within a specified time-window,
wherein the deliverable pickup fulfillment at the designated ESA of the DPNV is accessible to the customer at the ESA upon as soon as the wireless communication check-in, obviating physical inputs and/or interactions by the customer at one or more ESA customer interface devices and an expending of a period of time for one or more physical device transactions.

5. The method of claim 1, further comprising incorporating at least a first transceiver at a designated ESA of the DPNV operative to communicate wirelessly with a PWC device of a DPNV customer at the ESA,
wherein checking-in the DPNV customer for a first dual-commerce deliverable pickup fulfillment at the ESA, via the wireless communication, comprises verifying at least the identity of the customer at the ESA, or the order for the dual-commerce deliverable(s), or both, substantially at the same time of the wireless check-in,
wherein checking-in the customer wirelessly expedites the deliverable pickup fulfillment of the deliverable(s) provided at the ESA, obviating a check-in requiring one or more physical inputs and/or interactions made by a customer at one or more ESA customer interface devices and an expending of a period of time for one or more physical device transactions and/or interactions.

6. The method of claim 1, further comprising:
representing, in a PWC device or a handheld PWC device accessible user interface associated with at least one retail DPNV, presented on a display of the PWC device or the handheld PWC device one or more in-stock dual-commerce retail deliverable(s) available for selection in an online order of the at least one DPNV, based on at least one of current deliverable availability data and real-time updating of the data;
reporting current deliverable availability data, to a PWC device accessible user interface associated with the at least one retail DPNV, pertaining to an inventory of in-stock dual-commerce retail deliverable(s) available for fulfillment by first dual-commerce deliverable pickup fulfillments or second dual-commerce deliverable fulfillment deliveries, or both;
presenting in the GUI one or more of the in-stock retail dual-commerce available deliverables, available for selection in an online order of the DPNV, based on the current deliverable availability data;
adjusting the deliverable availability data, pertaining to a first one of a retail dual-commerce deliverable in-stock, to an updated current availability, upon a selecting of the deliverable for a first online order, such that a second one of the retail dual-commerce deliverable in-stock is represented available for selection in a second online order of the DPNV, substantially at the same time of the selecting of the deliverable for the first online order.

7. The method of claim 1, further comprising:
determining by an at least one networked-computer a current availability of at least one dual-commerce available deliverable selected by a customer in the online order of the DPNV for the first dual-commerce deliverable pickup fulfillment; and, based on an availability of the selected deliverable determined available by the networked-computer,
providing the customer, at least one of a same-day availability, a guaranteed availability, for the at least one dual-commerce available deliverable selected in the online order for the deliverable pickup fulfillment at a designated ESA of the DPNV, within a specified time-window.

8. The method of claim 1, further comprising:
allocating by a DPNV at least one of a designated ESA of a given size and scheduled customer visit capacity, a designated ESA scalable in size and scheduled customer visit capacity of a DPNV;
providing fulfillment of first dual-commerce deliverable pickup fulfillment to customers at the given size or the scalable in in size designated ESA on a one-customer-at-a-time basis for at least one of
a sequential plurality of first dual-commerce deliverable pickup fulfillments each provided to a respective scheduled ESA visit customer within a distinct specified time-window; and
a sequential plurality of dual-commerce deliverable procurements each provided to a respective non-scheduled visit customer.

9. The method of claim 1, further comprising:
scheduling by the at least one networked-computer each of one or more determined schedulable ESA visit time-windows within at least one of
a scheduled plurality of sequential time-windows making up a flow or flow rate of customers at the ESA; and
a scheduled plurality of sequential time-windows making up a flow or flow rate of customers at the ESA at or within the customer visit capacity of the designated ESA.

10. The method of claim 1, wherein locating by a DPNV one or more designated ESA(s) indoors or outdoors in at least a subarea location of the retail DPNV further comprises locating by the DPNV, an at least one subarea location adjacent an exterior side of DPNV, or area separate from and near to the DPNV, or both, for one or more of the designated ESA(s) of the DPNV.

11. The method of claim 1, further comprising scaling each of one or more scalable designated ESA(s) of at least one DPNV to an expanded size and customer visit capacity, or to a contracted size and customer visit capacity in response to a scheduling by a networked-computer of a respective increased or decreased plurality of scheduled time-windows, making up at least one of:
a flow or flow rate of scheduled ESA visit customers at least one scalable designated ESA(s) of at least one DPNV; and
a flow or flow rate of schedule ESA visit customers at or within the scheduled customer visit capacity of at least one scalable designated ESA(s) of the at least one DPNV.

12. The method of claim 1, further comprising scheduling by an at least one networked-computer a reserved parking at at least one of a single-facility venue, a multi-venue facility, to occur concurrent with at least one first dual-commerce deliverable pickup fulfillment provided to a customer at a designated ESA of a respective DPNV, within a specified time-window.

13. The method of claim 1, further comprising querying by a networked-computer a DPNV customer for a preferred one or more schedules or time-periods within which to arrive at and visit an ESA-equipped DPNV and determining, at least one time-window for a visit at the ESA-equipped DPNV within or closest to at least one schedule or time-period preferred by the customer; and
taking into account one or more dual-commerce available deliverable(s) selected in on online order of the DPNV for a first dual-commerce deliverable pickup fulfillment, scheduled and schedulable customer event time-windows for expedited service area visits at the DPNV;
scheduling one of:
a determined schedulable time-window within, or
a determined schedulable time-window closest fitting or closest available to, the at least one schedule or time-period preferred by the customer.

14. The method of claim 1, further comprising:
presenting in a graphical user interface on a display of a GPS equipped PWC device, an ESA visit itinerary downloaded to the PWC device;
including in the downloaded ESA visit itinerary at least one scheduled ESA visit time-window for a first dual-commerce deliverable pickup fulfillment at a designated ESA of a respective DPNV, within a specified time-window;
receiving by the mobile PWC device via at least one of the internet, one or more ESA wireless transceivers, a wireless network, scheduled itinerary information; and
presenting, in the graphical user interface on the display of the PWC device at least in advance of one or more scheduled first dual-commerce deliverable pickup fulfillments, one or more text prompts in time with a customer's current progress, of an in-use ESA visit itinerary, and to at least one scheduled deliverable pickup fulfillment destination,
wherein a first text prompt, or each of sequential text prompts, presents one or more of an amount of remaining time prior to one or more specified deliverable fulfillments of the ESA visit itinerary, specific instructions as to which way a customer should go or proceed relative to their current location to get to a next destination of the ESA visit itinerary.

15. The method of claim 1, wherein culminating an ESA at a designated ESA within a specified time-window, comprising at least one of:

verifying, by an at least first customer interface device, a customer identity, or order for a first dual-commerce deliverable pickup fulfillment, or both, at a designated ESA within a specified time-window; and
receiving, by an at least one customer interface device, a payment at the designated ESA within the specified time-window for the order comprises:
one or more of the following apparatus in communication with at least one of the at least first and the at least one customer interface devices, or in wireless communication with a PWC device of the customer at the designated ESA:
a networked-computer equipped with a display and graphical user interface, a computer-interfaced keyboard, a computer-interfaced keypad, a PIN entry device, an electronic-signature pad, a magnetic card-strip reader, a financial transaction card reader operative to read one or more of financial transaction card information, credit card information, membership card information, at least one device operative to communicate wirelessly with the PWC device of the customer at the ESA via one or more of infrared, Bluetooth, radio wave, frequencies or frequency ranges.

16. The method of claim 1, further comprising:
automatically reporting by a networked-computer communicatively coupled with venue-condition monitoring and reporting apparatus, first dual-commerce deliverable pickup fulfillments culminated at an at least one designated ESA of at least one DPNV; and
adjusting an availability of scheduled and schedulable customer event time-windows in data pertaining to scheduling the at least one designated ESA, in accordance with the automatic reporting.

17. The method of claim 1, further comprising:
scaling each of one or more scalable designated ESA(s) of at least one DPNV to at least one of an expanded or contracted size, customer visit capacity and customer interface station capacity, in response to a networked-computer determining respectively an increased or a decreased flow or flow rate of scheduled ESA visits at the DPNV, wherein expanding or contracting a scaling of a designated ESA in one or more directions incorporates respectively at least one of an increased or decreased one or more customer interface stations at or within the ESA and an increased or decreased number of standing customers or seated customers at or within the ESA; and,
providing at each of one or more customer interface stations within an expanded or contracted scalable ESA a respective first dual-commerce deliverable pickup fulfillment, wherein each scaling of the scalable designated ESA to expand or contract in one or more directions is scaled independent of one or more customer interface stations within the scalable designated ESA.

18. The method of claim 1, further comprising:
presenting a first PWC device accessible user interface associated with a first DPNV or name of the DPNV in a graphical user interface on a display of the device, wherein the first DPNV comprises a chain of DPNVs each providing a merchandise category of products or goods available to at-venue walk-in customers and deliverable pickups to scheduled ESA visit customers, and provides fulfillments of online ordered deliverables of different deliverable categories fulfilled by an available one of the dual-commerce deliverable fulfillments;

presenting in the first user interface a choice of different category DPNV user interfaces each available for selection and associated with a primary category of deliverable(s) fulfilled by a respective one or more DPNVs; wherein, presenting, in response to a selecting of a first deliverable category DPNV user interface to the user, on the PWC device display, an available one or more DPNV deliverables of the first category available for selection in an online order of the first DPNV;

a selecting of at least a second deliverable category type user interface presents to the user, on the PWC device display, an available one or more DPNV deliverables of the second category available for selection in an online order of the first DPNV;

receiving a selection of at least one deliverable in each of different deliverable category user interfaces, or the first user interface, or a plurality of the user interfaces, for the online order;

consolidating the online order comprising the deliverables selected in the user interfaces into a single online order; and fulfilling each one of the deliverables selected in the user interfaces in accordance with at least one of the first dual-commerce deliverable fulfillment, the second dual-commerce deliverable fulfillment.

19. The method of claim 1 further comprising:
providing at least one designated ESA, allocated by the DPNV at one of the subarea location within or adjacent a side of, or the area separate and near to, the DPNV;
determining by a networked-computer an available time-window within an ESA visit itinerary for a first dual-commerce deliverable fulfillment at the designated ESA, wherein the designated ESA providing the first dual-commerce deliverable fulfillment to a customer at the DPNV is the itinerary destination; and
providing in the itinerary, the first dual-commerce deliverable pickup fulfillment at the designated ESA, a single-destination, obviating a need for the customer to enter, traverse or encounter delays in one or more of the areas allocated by the DPNV for non-scheduled visit customers, reducing time spent by the customer at the DPNV.

20. The method of claim 1, further comprising determining by the networked-computer at least one ESA visit time-window of an ESA visit itinerary for a first dual-commerce deliverable pickup fulfillment at a designated ESA of at least one single-facility DPNV or multi-venue facility DPNV, wherein one of the DPNV, the designated ESA of the DPNV, providing the deliverable fulfillment is the destination of the ESA visit itinerary,
wherein presenting the ESA itinerary in a graphical user interface on a display of a mobile downloading the ESA visit itinerary to a PWC device of a customer of the DPNV comprises the ESA visit itinerary of the DPNV received by a mobile PWC device comprising a screen display, graphical user interface and GPS, at least in advance of the deliverable pickup fulfillment provided at the designated ESA.

21. The method of claim 20, further comprising:
presenting the downloaded ESA visit itinerary in the graphical user interface on the display of the mobile PWC device of the customer at least in advance of the deliverable pickup fulfillment scheduled to occur at the designated ESA;
communicating scheduled itinerary information to the mobile PWC device via at least one of the internet, one or more transceivers, a wireless network;
representing in the graphical user interface a current location of the DPNV customer relative to the itinerary DPNV-designated ESA destination of the single-facility DPNV, or a multi-venue facility DPNV, wherein such facilities comprise areas indoors and/or outdoors traversed by customers; and wherein, the representation comprises:
graphically or pictorially representing instructions to direct the customer, at or within one or more facility(s) and one or more areas thereof, by one or more of:
photographs, diagrams, maps, graphical elements, arrows, graphical depictions, to indicate which way he or she should proceed relative to their current position to the DPNV-designated ESA destination; and
providing the first dual-commerce deliverable pickup fulfillment within a scheduled ESA visit time-window at the DPNV-designated ESA destination.

22. The method of claim 21, wherein directing a DPNV customer to the ESA visit itinerary destination or stop, relative to the current location of a DPNV customer, comprises displaying in the graphical user interface on the display of the mobile PWC device the navigational instructions in at least one of a text description, a sequence of text descriptions, contextual to at least one destination or stop of the ESA visit itinerary.

23. The method of claim 1, further comprising:
scheduling, by at least one networked-computer each of a plurality of first dual-commerce deliverable pickup fulfillments to occur in respective ESA visit time-windows at one or more of
a single station, a plurality of separate or laterally disposed stations, or a series of laterally disposed, station(s) of a designated ESA of a given, or scalable, ESA size and scheduled customer visit capacity, at a DPNV, taking into account the deliverable(s) selected in an online order for each first dual-commerce deliverable fulfillment, and scheduled and schedulable customer event time-windows for ESA visits at the DPNV,
wherein the plurality of first dual-commerce deliverable pickup fulfillments, each scheduled to occur in a respective ESA visit time-window at a respective DPNV comprise one or more of:
concurrent, sequential, successive, ESA visit time-windows making up a flow or flow rate of customers at the designated ESA(s), or a flow or flow rate at or within a scheduled customer visit capacity of the designated ESA(s).

24. The method of claim 1, further comprising:
presenting in a graphical user interface on the display of a PWC device a user interface associated with at least one retail DPNV, in stock dual-commerce retail deliverables available for selection in an online order of the DPNV, based on one or more real-time deliverable availability data updates;
maintaining, by a networked-computer, a current deliverable availability data pertaining to an inventory of the dual-commerce retail deliverables available for fulfillment by first dual-commerce deliverable pickup fulfillments or second dual-commerce deliverable fulfillment deliveries, or both; and
adjusting, the deliverable availability data pertaining to an availability of each of the dual-commerce retail deliverable in stock to a current availability, in response to a first one of the retail dual-commerce deliverable being selected in a first online order, such that a second one of the retail dual-commerce deliverable in stock is represented available for selection in a second online order of the DPNV, substantially the same time of the retail dual-commerce deliverable selected in the first online order.

25. The method of claim 1, further comprising:
a first PWC device accessible software user interface associated with a first DPNV or name of the DPNV, wherein dual-commerce available deliverables of the DPNV comprise a merchandise category of products or goods available for first dual-commerce deliverable pickup fulfillments within specified time-windows at a respective designated ESA, and available for second dual-commerce deliverable fulfillments by a delivery or sending to a specific location;
presenting in the first user interface on a display of a PWC device of a customer of at least one DPNV a choice of at least two different deliverable category type DPNV user interfaces, each available for selection in the first user interface and associated with a respective at least one ESA-equipped DPNV in accordance with a primary category of deliverable(s) fulfilled by the DPNV;
upon the customer, selecting a first deliverable-category user interface presenting on the display of the PWC device at least one available primary deliverable of a first deliverable-category DPNV available for selection in an online order;
selecting at least a second deliverable-category user interface presenting on the display of the PWC device at least one available primary deliverable of an at least second deliverable-category DPNV available for selection in an online;
selecting at least one deliverable in each of at least two different deliverable-category DPNV user interfaces for the online order;
consolidating the deliverable selected into a single online order procedure; and based on the deliverables selected; and
presenting to the user a choice to fulfill the consolidated order by a selecting of at least one of:
a first dual-commerce deliverable fulfillment comprising a pickup or procurement at a respective ESA within a networked-computer determined time-window; and
a second dual-commerce deliverable fulfillment comprising a delivery or sending of the selected deliverable(s) to a specific location.

26. The method of claim 1, further comprising at least one of:
verifying a customer identity, or order for a first dual-commerce deliverable pickup fulfillment, or both, at a designated ESA within a specified time-window by an at least first customer interface device; and
receiving a payment at the designated ESA within a specified time-window for the order by an at least one customer interface device,
wherein the at least first customer interface device, or the at least one customer interface device, or both, are one or more of the following:
a computer-interfaced keyboard, a computer-interfaced keypad, a PIN entry keypad, an electronic-signature pad, a magnetic card-strip reader, a financial transaction card reader operative to read one or more of financial transaction card information, credit card information, membership card information, at least one device operative for wireless communication in one or more of infrared, Bluetooth, radio wave, frequencies or frequency ranges.

27. The method of claim 1, wherein the PWC device accessible software user interface is a merchandise DPNV user interface associated with a retail merchandise DPNV and name of the DPNV comprising:
presenting in a graphical user interface (GUI) on a display of a PWC device the first user interface of the merchandise DPNV, a user interface access to merchandise deliverables available for selection in an online order of the merchandise DPNV for first dual-commerce deliverable fulfillment ESA pickups, or second dual-commerce deliverable fulfillments by a sending or delivery, or both; and
providing browsing of distinct types of merchandise deliverables available for first dual-commerce deliverable fulfillments, second dual-commerce deliverable fulfillments, and selection in the online order of the merchandise DPNV, by one or more of a merchandise category type, name of a merchandise networked-venue, product(s) type, product(s) price, product(s) tax, product(s) currently available, product size(s), product dimension(s), product(s) age, product(s) year, product(s) color.

28. The method of claim 1, wherein the PWC device accessible software user interface is a first merchandise category user interface associated with a merchandise DPNV and name of the DPNV including in the first merchandise DPNV user interface a user accessible browsing feature operative to selectively browse first merchandise user interface available and other dual-commerce available merchandise deliverables, available for selection in an online order of the merchandise DPNV for first dual-commerce deliverable fulfillment ESA pickups and second dual-commerce deliverable fulfillments by a sending or delivery;
presenting the merchandise DPNV user interface and user accessible browsing feature in a graphical user interface (GUI) on a display of a PWC device in response to a user of the PWC device selecting the user interface; and
providing the user with access to the selective browsing of distinct types of merchandise deliverables available for first and second dual-commerce deliverable fulfillments, and selection in the online order of the merchandise DPNV, by one or more of a merchandise type, name of a merchandise networked-venue, product(s) type, product(s) price, product(s) tax, product(s) currently available, product size(s), product dimension(s), product(s) age, product(s) year, product(s) color.

29. The method of claim 1, further comprising representing in a PWC device accessible user interface associated with one or more DPNVs deliverables available for selection for one or more of the first dual-commerce deliverable pickup fulfillments, or one or more of the second dual-commerce deliverable fulfillment deliveries, or both, via one or more of: instant messaging, email, text, digital video files, digital audio files, computer-storable files, photographs, faxes, graphical depictions, line art.

30. The method of claim 1, further comprising recording via a networked-computer communicatively coupled with at least one database and databased venue-condition data, at least one of:
customer use of an ESA customer interface device and one or more of ESA transaction(s), ESA customer interaction(s) at one or more single venue facility DPNVs or multi-venue facility DPNVs; and
online ordering of one or more deliverables of at least one DPNV, concurrent with each customer transaction.

31. The method of claim 1, further comprising providing, for one or more scheduled transactions or interactions a same-day availability of at least one online ordered dual-commerce available merchandise deliverable is provided at one of a designated ESA, station or bay of a DPNV, within a specified time-window.

32. The method of claim 1, further comprising guaranteeing the availability of at least one online ordered dual-commerce available deliverable to the customer at one of a designated ESA, station, or bay of a DPNV, within a specified time-window.

33. the method of claim 1, further comprising receiving by a customer interface device at a designated ESA, a cede associated with a DPNV online order including a first dual-commerce deliverable fulfillment, and in response to receiving the code by the customer interface device permit a customer at the DPNV online order an access at the designated ESA to the first dual-commerce deliverable fulfillment.

34. The method of claim 1, further ccrnprising:
- a multi-DPNV itinerary including a sequencing of ESA visits wherein each ESSA visit is scheduled for a respective one of a plurality of DPNVs of different locations;
- sequencing each ESSA visit at the multi-DPNV itinerary in a scheduled one of a plurality of distinct time-windows for a first dual commerce deliverable fulfillment at a designated ESSA at a respective DPNV;
- determining by the at least one networked-computer each distinct time-window for a sequenced ESA visit at a respective DPNV, based at least in part on one or more online represented dual-commerce available deliverables of a respective DPNV being selected in an online order, and data pertaining to scheduled and schedulable ESA visits of the DPNVs; and
- presenting the multi-DPNV itinerary, in a GUI in a display at a GPS-equipped PWC device or GPS-equipped handheld PWC device at least in advance of an upcoming one at more of the sequenced ESSA visits.

35. The method of claim 34, further comprising providing in the multi-DPNV itinerary in the GUI in a display of the GPS-equipped PWC device or the GPS-equipped handheld PWC device, for at least one of the plurality of DPNVs, navigational instructions that direct a customer, relative to their current location, to at least one of the DPNVs.

36. A system for expediting fulfillments of online ordered dual-commerce available deliverables using expedited-service area (ESA) pickups in specified time-windows and by delivery to specific locations, as selected in a graphical user interface (GUI) present in a display screen of a personal wireless communication (PWC) device, or a handheld PWC device, the system comprising:
- a communication network;
- at least one networked-computer in communication with the communication network;
- at least one physical deliverable provider networked-venue (DPNV) of a single-venue facility, or a single-venue facility chain, or a multi-venue facility, any one of which is open to the general public as a provider of deliverables comprising one or more of retail products, goods, items of merchandise, available for order online, for dual-commerce fulfillments comprising at-venue pickup fulfillments within specified time-windows and delivery or sending fulfillments made to specific locations, the DPNV comprising one or more designated expedited-service areas (ESAs) where scheduled at-venue deliverable pickup fulfillments of one or more ordered retail dual-commerce available deliverables are provided, each of one or more of the designated ESAs:
  a) located indoors or outdoors at a location within, or adjacent a side of, or nearby, the DPNV;
  b) designated and/or marked, in a manner readily discernible to customers at the DPNV;
  c) at least one of an area, a standing area, a seating area, of a size and scheduled ESA visit capacity sufficient to provide each of one or more customers at the ESA a respective pickup fulfillment of one or more retail dual-commerce available deliverables, within one of a sequence of scheduled time-windows making up a flow or flow rate of scheduled ESA visit customers;
  d) located separate from or adjacent one or more areas of the DPNV normally traversed by non-scheduled visit customers each expending a first time period due to a plurality of one or more venue area search(es) for, a retrieval of, an unavailability of, a not finding of, one or more deliverables sought, and a second time period due to one or both of a locating of another venue area to procure and/or pay for, a lining up of non-scheduled visit customers waiting to procure and/or pay for, one or more at-venue deliverables sought after, available, found and retrieved; and
  e) including at least one customer interface device accessible to a customer at the designated ESA within a specified one of a sequence of scheduled time-windows;
- a PWC device or a handheld PWC device software user interface associated with the at least one DPNV,
- wherein the GUI shows a representation of the DPNV and based at least partly on a database store of data and updated data pertaining to an availability of one or more retail deliverables for dual-commerce fulfillments by the DPNV, presents in the display screen of the PWC device or handheld PWC device at least a representation of a current available one or more of the retail deliverables, available for selection in an online order of the DPNV and for at least one of:
  - a first dual-commerce deliverable fulfillment comprising a pickup fulfillment of a selected one or more of the retail deliverables, provided at a designated ESA of the DPNV within one of a sequence of scheduled customer event time-windows making up a flow or flow rate of ESA visits within, or at, an ESA visit capacity of the ESA, and
  - a second dual-commerce deliverable fulfillment comprising a delivery or sending fulfillment of a selected one or more of the retail deliverables made to a specific location; and
- the at least one networked-computer and one or more software routines executable by the networked-computer, that when executed cause the networked-computer to determine at least one time-window for the deliverable pickup fulfillment at a designated ESA of the DPNV, based at least in part on the available retail deliverable(s) selected in the online order for the first dual-commerce deliverable fulfillment, and on, a database store of data and updated data indicating at least one schedulable customer event time-window for the first deliverable pickup fulfillment at the designated ESA of the DPNV,
- wherein the deliverable pickup fulfillment at the designated ESA of the DPNV is made accessible to the customer within the computer determined time-window, upon as soon as a verification, by at least one ESA customer interface device, of the identity of the customer, the order for the dual-commerce deliverable(s), or both, for the retail dual-commerce available deliverable(s) selected in the online order for the deliverable pickup fulfillment.

37. The system of claim 36, further comprising:
at least a first customer interface device of the DPNV;
a designated ESA of the DPNV; and
a workstation or bay of a designated ESA of the DPNV having at least one wireless transceiver,
wherein the at least one wireless transceiver operative to communicate via at least one wireless communication format compatible with at least one handheld PWC device of a respective DPNV customer at the designated ESA,
wherein, a bi-directional wireless communication established between the at least one wireless transceiver and the at least one handheld PWC device is employed for an expedited checking-in of the respective DPNV customer at the designated ESA, for the first dual-commerce deliverable fulfillment and wherein a corresponding deliverable pickup fulfillment at the designated ESA is expedited, by obviating a manual check-in made by one or more physical inputs and/or interactions of the respective customer at the at least one customer interface device, and an expending of a period of time for any of such.

38. The system of claim 36, further comprising:
one or more retail dual-commerce available deliverables represented in the GUI, selected in the online order of the DPNV for a first dual-commerce deliverable fulfillment; and
at least one pre-payment made online for the one or more retail deliverables selected, received prior to the first dual-commerce deliverable fulfillment,
wherein, a corresponding deliverable pickup fulfillment at the designated ESA is expedited, by obviating at least one of a cash payment at the DPNV, an at-venue one or more physical inputs and/or interactions of the DPNV customer at an at least one ESA customer interface device, and an expending of a period of time for any of such.

39. The system of claim 38, further comprising:
a bi-directional communication link established, via a wireless communication protocol, between at least one of a transceiver, a customer identification and order confirmation apparatus, of at least one designated ESA of the DPNV, and at least one handheld PWC device of a respective DPNV customer at the designated ESA;
wherein upon the pre-payment made online for the one or more retail dual-commerce available deliverables selected in the DPNV online order, having been received prior to the first dual-commerce deliverable fulfillment;
a wireless bi-directionally linked confirmation of a check-in, made via the bi-directional communication link established between the at least one handheld PWC device and the at least one of the transceiver, the customer identification and order confirmation apparatus, and the confirmation including a verification of at least one of the identity of the customer, order information, a price confirmation; and
a corresponding deliverable pickup fulfillment at the designated ESA of the DPNV is made accessible to the customer at the ESA substantially the same time of the wireless communication check-in, obviating the need for an at-venue payment, and one or more physical inputs and/or interactions by the customer at one or more ESA customer interface devices, and an expending of a period of time for any of such.

40. The system of claim 36, further comprising:
at least one wireless transceiver of at least one of the designated ESA(s) of the DPNV, a bay or a workstation of a designated ESA of the DPNV, operative to communicate via a bi-directional wireless communication link with a handheld PWC device of a DPNV customer at the ESA; wherein,
a wireless check-in for a first dual-commerce deliverable fulfillment at the ESA, by use of the handheld PWC device in communication with the at least one wireless transceiver via the bi-directional wireless communication link, provides verification of at least one of the identity of the customer, order information, a price confirmation, substantially at the same time of the wireless check-in; wherein,
the wireless check-in for the first dual-commerce deliverable fulfillment at the ESA, obviates a check-in including one or more physical inputs and/or interactions made by a customer at one or more ESA customer interface devices and an expending of a period of time for one or more of such.

41. The system of claim 36, further comprising:
the at least one interface to one or more venues communicatively coupled with the database store of data and updated data; wherein the store of data includes venue condition data pertaining to at least one of an availability of, an inventory including, one or more dual-commerce available retail deliverables of the DPNV updated to a current availability, upon at least one of:
a regular update being made; and
a real-time update of or a real-time adjustment to, an inventory record of at least one of the retail deliverables, made substantially at the same time the at least one retail deliverable is selected and reserved, or purchased, in an online order of the DPNV,
wherein the GUI presents a representation of a current available one or more of the retail deliverables available for selection in an online order of the DPNV, substantially at the same time of the at least one update being made.

42. The system of claim 36, wherein the GUI presents the representation of at least a current available one or more retail deliverables, available for selection in the online order of the DPNV, and
based at least in part on at least one of the current available retail deliverables being selected in the online order for a first dual-commerce deliverable fulfillment and at least one time-window for the deliverable fulfillment determined schedulable by the at least one networked-computer on the same day as the online order;
a same-day pickup fulfillment of the retail deliverable(s) selected in the online order, is scheduled at a designated ESA of the DPNV for the first dual-commerce deliverable fulfillment.

43. The system of claim 36, further comprising an itinerary shown, by the GUI, presented on a display of the handheld PWC device; wherein, the itinerary includes at least one computer determined time-window specified for a respective scheduled first dual-commerce deliverable fulfillment at a designated ESA of the DPNV.

44. The system of claim 36, further comprising:
at least one designated ESA of the DPNV, having at least one of a given customer capacity size, an expanded customer capacity size, a contracted customer capacity size, wherein at least one available time-window determined by the networked-computer for a first dual-commerce deliverable fulfillment at the designated ESA within is one of a scheduled plurality of at least one of:

sequential, concurrent, successive, ESA visit time-windows making up at least one of: a scheduled flow or flow rate of customers for pickup fulfillments provided at the designated ESA, a flow or flow rate of customers for pickup fulfillments provided at the designated ESA at or within the customer visit capacity of the designated ESA.

45. The system of claim 36, wherein the DPNV is at least a first merchandise DPNV, wherein the at least one interface shown by the GUI is an interface to one or more merchandise networked venue(s) or store(s), which includes a representation of at least the first merchandise DPNV, and is in communication with at least one database including data and updated data pertaining to at least current available merchandise items, products or goods, of at least the first merchandise DPNV, available for selection for at least one of the first dual-commerce deliverable fulfillment, the second dual-commerce deliverable fulfillment, wherein the GUI is configured to permit browsing of at least one of a) the merchandise items, products or goods, b) entertainment-content, c) product parameters, of at least one merchandise DPNV, by respective related categories, including one or more of:

the merchandise items, products or goods categorized by one or more of type of merchandise venue(s), name of merchandise venue(s), type of product(s), product(s) currently available;

the entertainment-content categorized by one or more of hits, specials, alphabetized artists, film genres, music genres;

the product parameters categorized by one or more of price(s), tax(es), size(s), dimension(s), color(s), product age(s), product year(s), and wherein the interface to one or more merchandise networked venues, facilities or stores, shows, based on a browsing of one or more of the categories, at least a current available one or more deliverables of the at least the first merchandise DPNV, available for selection for at least one of the first dual-commerce deliverable fulfillment, the second dual-commerce deliverable fulfillment.

46. The system of claim 36, wherein the DPNV is at least a first merchandise DPNV, wherein the at least one interface shown by the GUI is an interface to one or more merchandise venue(s) or store(s), which includes a representation of at least the first merchandise DPNV, and at least current available merchandise items, products or goods of at least the first merchandise DPNV, available for one or both of the first dual-commerce deliverable fulfillment, the second dual-commerce deliverable fulfillment, and wherein the GUI presents a representation of at least one of the current available merchandise items, products or goods by use of one or more of: graphical depiction(s), photograph(s), digital video file(s), digital audio file(s), alphanumeric text(s), line art, computer-storable file(s), email(s), fax(es), instant messaging, preview(s) of streaming entertainment-content including at least one of streaming video, streaming audio, and wherein at least one of the current available merchandise items, products or goods represented, is made available for selection in the online order of the at least first merchandise DPNV for at least one of the first dual-commerce deliverable fulfillment, the second dual-commerce deliverable fulfillment.

47. The system of claim 36, further comprising:

present in the GUI, an itinerary including at least one networked-computer determined time-window specified for a respective scheduled first dual-commerce deliverable fulfillment at a designated ESA of the DPNV; and the designated ESA deliverable fulfillment, being within, adjacent a side of, or near to the DPNV, including at least one of a staffing of one or more personnel of the DPNV, a scheduled parking, a reserved parking, provided at least concurrent with the first dual-commerce deliverable fulfillment.

48. The system of claim 36, further comprising:

receipt from a DPNV online order customer of at least one preferred time-window for a first dual-commerce deliverable fulfillment at a designated ESA of the DPNV, wherein a time-window determined by the at least one networked-computer for the first dual-commerce deliverable fulfillment, is based at least in part on the at least one time-window preferred by the customer and on a store of data indicative of currently scheduled and schedulable customer event time-windows, and wherein the scheduled time-window determined, is at least one of a time-window in accordance with, a time-window best fitting, the at least one time-window preferred by the customer.

49. The system of claim 36, further comprising:

the handheld PWC device being a GPS equipped device;

present, in the GUI, on the display of the handheld PWC device, an itinerary including a specified time-window for at least one scheduled first dual-commerce deliverable fulfillment at a designated ESA of a respective DPNV;

information pertaining to the itinerary, communicated via at least one of the internet, one or more at-venue wireless transceivers, the GPS, received by the handheld PWC device; wherein, based at least in part on the received information, the GUI shows, at least one alphanumeric textual prompt at least in advance of a respective first dual-commerce deliverable fulfillment, the prompt including deliverable fulfillment related text contextual to and informing the customer of at least one of: a specified one or more deliverables upcoming for, a current amount of time remaining prior to, at least one scheduled first dual-commerce deliverable fulfillment included in the itinerary.

50. The system of claim 36, further comprising:

at least one of a designated ESA of the DPNV, a bay or a workstation of a designated ESA of the DPNV, including one or more of customer identification device(s), order verification device(s), accessible to an ESA visit customer within the computer determined time-window for the first dual-commerce deliverable fulfillment, the device(s) comprising one or more of:

a networked-computer equipped with a display and graphical user interface, a computer-interfaced keyboard, a computer-interfaced keypad, a PIN entry device, an electronic-signature pad, a magnetic card-strip reader, a financial transaction card reader of one or more of financial transaction card information, credit card information, membership card information, at least one of a wireless device, a transceiver, operative to communicate with at least one handheld PWC device of a respective customer at the ESA via one or more of infrared, Bluetooth, radio wave, frequencies or frequency ranges.

51. The system of claim 36, further comprising:

the DPNV being at least a first merchandise DPNV and a dual-commerce entertainment-content deliverable provider;

the at least one interface, shown by the GUI, being an interface to one or more merchandise venue(s) or store(s), which includes an online representation of the at least first merchandise DPNV;

the interface to the one or more merchandise venue(s) or store(s) communicatively coupled with at least one database including data and updated data pertaining to at least current available merchandise items, products or goods and digital entertainment-content of the at least first merchandise DPNV, available for one or both of the first dual-commerce deliverable fulfillment, the second dual-commerce deliverable fulfillment, and configured to provide at least one of a browsing, by one or more categories, of the at least current available merchandise items, products or goods and digital entertainment-content and a digital media previewing of digital entertainment-content;

wherein, one or more current available digital entertainment-content deliverables available for selection in an online order of at least the first merchandise DPNV, include at least one of retail digital media content deliverables, in an optical disc format available in video formats of different video quality, available for fulfillment by at least one of the first dual-commerce deliverable fulfillment, the second dual-commerce deliverable fulfillment, and digital entertainment-content deliverables available for fulfillment by a streaming content delivery made in at least one of a streaming video, a streaming audio, a digital video, a digital audio, file format transmissible via a high-speed bandwidth connection to the Internet.

52. The system of claim 36, further comprising:

at least one designated ESA located within, adjacent a side of, or near to the DPNV, which includes a plurality of evenly spaced-apart customer interface stations or bays communicatively coupled with at least one at-venue networked-computer, and one or more customer interface devices of each of a plurality of the stations or the bays accessible for use within a networked-computer determined time-window scheduled for a first dual-commerce deliverable fulfillment;

the at least one designated ESA being scalable in size and customer visit capacity to one or more expanded ESA size(s) to accommodate an increase in concurrent scheduled ESA-visits, and being scalable in size and customer visit capacity to one or more contracted ESA size(s) to accommodate a decrease in concurrent scheduled ESA-visits, in accordance with concurrent scheduled ESA-visit time-windows determined by the at least one networked-computer, for first dual-commerce deliverable fulfillments at the designated ESA, wherein the one or more customer interface devices of a station or a bay employed during a first dual-commerce deliverable fulfillment provided at the at least one designated ESA, include one or more of: a networked-computer equipped with a display and graphical user interface, a computer-interfaced keyboard, a computer-interfaced keypad, a PIN entry device, an electronic-signature pad, a magnetic card-strip reader, a financial transaction card reader of one or more of financial transaction card information, credit card information, membership card information, at least one at-venue wireless device or transceiver operative to communicate with the handheld PWC device at the ESA via at least one of infrared, Bluetooth, radio wave, frequencies or frequency ranges.

53. The system of claim 52, wherein upon, an increase in concurrent scheduled ESA-visit time-windows being determined by the at least one networked-computer, the designated ESA is expanded in size such that an increased number of the evenly spaced-apart customer interface stations or bays are included within the bounds of the expanded size designated ESA, and upon, a decrease in concurrent scheduled ESA-visit time-windows being determined by the at least one networked-computer, a decreased number of the evenly spaced-apart customer interface stations or bays are included within the bounds of the contracted size designated ESA.

54. The system of claim 36, further comprising:

the DPNV being a provider of dual-commerce available merchandise, products or goods;

at least one designated ESA located within, adjacent a side of, or near to the DPNV, including a plurality of laterally disposed customer interface stations or bays communicatively coupled with at least one at-venue networked-computer, and further including one or more customer interface devices of each of the stations or the bays;

each of one or more of the stations, the bays, made accessible for use by respective non-scheduled ESA visit customers at the DPNV, on a one customer at a time basis for at least one of:

an ordering and procurement, of one or more at-venue deliverables located adjacent, proximate or nearby the ESA, the deliverable(s) including at least one of one or more purchased, one or more rented, items of merchandise, products, goods of the DPNV;

a return of at least one of one or more purchased, one or more rented, items of merchandise, products, goods of the DPNV;

wherein, the one or more customer interface devices of the at least one of the stations, the bays, include one or more of: a networked-computer equipped with a display and graphical user interface, a computer-interfaced keyboard, a computer-interfaced keypad, a PIN entry device, an electronic-signature pad, a magnetic card-strip reader, a financial transaction card reader of one or more of financial transaction card information, credit card information, membership card information, at least one at-venue wireless device or transceiver operative to communicate with the handheld PWC device at the ESA via at least one of infrared, Bluetooth, radio wave, frequencies or frequency ranges.

55. The system of claim 36, further comprising:

present in the GUI, an itinerary including at least one networked-computer determined time-window specified for a respective first dual-commerce deliverable fulfillment at a designated ESA of the DPNV, wherein the GUI, present in a display of the handheld PWC device, shows the at least one computer determined time-window of the itinerary, at least in advance of the respective first dual-commerce deliverable fulfillment.

56. The system of claim 36, further comprising:

the GUI, present in the display of the handheld PWC device, including at least one itinerary, and the handheld PWC device being GPS equipped;

the at least one itinerary including one or more first dual-commerce deliverable fulfillment DPNV destinations;

scheduled itinerary information received by the handheld PWC device via at least one of the internet, the GPS, one or more transceivers of a single-venue facility, or a multi-venue facility, or a designated ESA;

the handheld PWC device and software executable thereon operative to indicate in the GUI via one or more of a textual, a graphical, a pictorial, an audio, a video, representation, navigational instructions, relative to a current location of a DPNV customer carrying the handheld PWC device, wherein at least one of graphically represented instructions, pictorially represented instructions, provided while the DPNV customer is at or within a single facility or multi-venue facility, includes one or more of:

photographs, diagrams, maps, graphical elements, arrows, graphical depictions, a directional arrow shown relative to a graphically depicted map, being employed to show which way the DPNV customer should proceed, relative to his or her current location, and at least one of a DPNV destination of the itinerary, a parking location, a reserved parking location.

57. The system of claim 36, further comprising:

at a single-venue facility or multi-venue facility, whereat the DPNV is located, at least one of a customer interfacing apparatus, a kiosk interface, either of which including at least one input/output (I/O) device, wherein the at least one I/O device includes at least one of: a networked-computer equipped with a display and graphical user interface, a computer-interfaced keyboard, a computer-interfaced keypad, a PIN entry device, an electronic-signature pad, a magnetic cardstrip reader, a financial transaction card reader of one or more of financial transaction card information, credit card information, membership card information, at least one I/O device operatively communicating with the handheld PWC device at the ESA via one or more of infrared, Bluetooth, radio wave, frequencies or frequency ranges.

58. The system of claim 57, further comprising:

in accordance with at least one itinerary including itinerary information, present in a display screen of at least one of the customer interface input/output (I/O) device, the kiosk interface I/O device;

the itinerary information including at least one time-window determined by the at least one networked-computer, for at least one first dual-commerce deliverable fulfillment scheduled at a respective DPNV; and at least one of the customer interface input/output (I/O) device, the kiosk interface I/O device, being operable to accept changes made to the at least one itinerary based on user input received by the I/O device, including at least one of an edit to, an addition to, an amending of, a rescheduling of, the at least one itinerary.

59. The system of claim 36, further comprising:

present in the GUI, an interface to one or more merchandise venue(s) or facility(s);

each of one or more of the merchandise venue(s) or facility(s) being a merchandise DPNV available for selection in the merchandise venue(s) or store(s) interface and a provider of one or more current available dual-commerce items of merchandise available for one or both of the first dual-commerce deliverable fulfillment, the second dual-commerce fulfillment;

the interface configured to permit a browsing of dual-commerce available merchandise items of at least one of the merchandise DPNVs, by at least one category, and display a representation of one or more current available dual-commerce items of merchandise available for selection in an online order, wherein the at least one browsing category corresponds to at least one of: type of merchandise venue(s), name of merchandise venue(s), type of product(s), product(s) currently available, product parameters corresponding to one or more of price(s), tax(es), size(s), dimension(s), color(s), product age(s), product year(s); and based at least in part on one or more browsed item(s) of merchandise being selected in the online order for a first dual-commerce deliverable fulfillment at one or more of the merchandise DPNVs, and a store of data indicating current scheduled and schedulable customer event time-windows pertaining to the fulfillment(s) at the one or more merchandise DPNV(s), the at least one networked computer and one or more software routines executed by the networked computer(s), cause the computer(s) to determine at least one of:

a customer event time-window scheduled for a first dual-commerce deliverable fulfillment at a respective one of the merchandise DPNVs, at least one itinerary including distinct customer event time-windows each scheduled for a first dual-commerce deliverable fulfillment at a respective one of a plurality of the merchandise DPNVs, the plurality of distinct time-windows sequenced in chronological order, and in accordance with availability, scheduled to collectively make up at least one of an itinerary best-fitting at least one preferred schedule of a respective customer, an itinerary scheduled to require the least amount of a respective customer's time.

60. The system of claim 59, further comprising:

one or more distinct time-windows, each determined by the networked-computer(s) for a respective first dual-commerce deliverable fulfillment, being specified in the at least one itinerary; and, the at least one itinerary configured to be downloaded to and displayed on a handheld PWC device, at least in advance of a respective one or more first dual-commerce deliverable fulfillments.

61. The system of claim 36, further comprising:

one or more itineraries each including one or more specified time-windows each scheduled for a respective first dual-commerce deliverable fulfillment at a designated ESA of a respective DPNV, and each itinerary, while in use or prior to use by a respective customer, including at least one specified time-window capable of being rescheduled;

ordering, reservation and scheduling apparatus communicatively coupled with at least one of one or more handheld PWC device(s), one or more venue-based display screen equipped networked-computer(s), and further coupled with one or more database including data pertaining to current scheduled customer-event time-windows and schedulable customer-event time-windows of a respective one or more DPNVs;

the ordering, reservation and scheduling apparatus including at least one networked-computer and software instructions executable by the networked computer(s) that when executed cause the computer(s) to:

reschedule at least one scheduled time-window of one or more of the itineraries, based at least in part on, at least one real-time request for a rescheduling, received over a wireless network from at least one of the one or more handheld PWC device(s), the one or more display screen equipped networked-computer(s), and data pertaining to the current scheduled and schedulable customer-event time-windows; wherein, one or more real-time requests for an itinerary time-window rescheduling include at least one of, a request for a break to be scheduled prior to one of, or intermediate, a plurality of scheduled time-windows of an itinerary, a request to expand a scheduled time-window duration of an itinerary, a request from each of at least a first customer and a second customer of a DPNV to mutually swap at least one scheduled time-window of an itinerary of the first customer with at least one scheduled time-window of an itinerary of the second customer; and present, upon at least one of the real-time requests being received, one or more time-window rescheduling options, selectable in a display screen of at least one of the one or more handheld PWC device(s), the one or more display screen equipped networked-computer(s).

62. The system of claim 36, wherein a plurality of dual-commerce available deliverables selected in the GUI for an online order of the DPNV, comprises:

one or more dual-commerce available deliverables selected in the online order for a first dual-commerce deliverable pickup fulfillment; one or more dual-commerce available deliverables selected in the online order for a second dual-commerce deliverable fulfillment delivery; and at least one networked-computer, configured to facilitate dual-commerce deliverable ordering and fulfillments, employed to consolidate the online order for the plurality of the dual-commerce deliverables selected in the GUI, into a single online order.

63. The system of claim 36, further comprising:

a representation, in the GUI, of the DPNV including a name of the DPNV and one or more current available retail dual-commerce deliverables available for selection in the online order of the DPNV;

the GUI configured to permit browsing of current available dual-commerce deliverable(s) by one or more categories, including one or more of: product type(s), product(s) model, product(s) price, product(s) tax, product(s) currently available, product size(s), product dimension(s), product(s) shape, product(s) age, product(s) color, and allow a user to select one or more retail dual-commerce deliverables from one or more of the categories, for the online order.

64. The system of claim 63, further comprising:

a multiple media representation of one or more of the current available retail dual-commerce retail deliverables available for selection, in the online order, for a first dual-commerce deliverable fulfillment and a second dual-commerce fulfillment, wherein the representation employs both online compatible media and transmissible media including at least two of: instant messaging, email, text, digital video files, digital audio files, computer-storable files, photographs, faxes, graphical depictions, line art.

65. The system of claim 36, further comprising:

the at least one networked computer communicatively coupled with at least one database including a store of data pertaining to dual commerce deliverable fulfillments of at least one of a DPNV of a single venue facility, at least one DPNV of a multi-venue facility; and one or more of the software routines executable by the at least one networked-computer, that when executed, cause the computer(s) to record a dual-commerce deliverable related data record in the at least one database, pertaining to one or more of an availability of, an ordering of, a fulfilling of, a customer transaction of, at least one of the first dual-commerce deliverable fulfillment, the second dual-commerce fulfillment, of the single venue facility DPNV or multi-venue facility at least one DPNV(s).

66. The system of claim 36, further comprising:

the at least one networked computer(s) communicatively coupled with at least one database having information stored therein, the information including data pertaining to either or both of dual commerce deliverable fulfillments of at least one of a DPNV of a single venue facility, at least one DPNV of a multi-venue facility; and one or more of the software routines executable by the at least one networked-computer(s), that when executed, cause the computer(s) to record a new, or update a prior, dual-commerce deliverable related data record in the at least one database associated with at least one of an availability of, an ordering of, a customer transaction of, a fulfilling of, the at least one of the first dual-commerce deliverable fulfillment, the second dual-commerce fulfillment, of the single venue favility DPNV or the multi-venue facility at least one DPNV.

67. The system of 36 further comprising a customer interface device at a designated ESA, operable to receive a code associated with a DPNV online order including a first dual-commerce deliverable fulfillment, and in response to the code being received by the customer interface device permit a customer of the DPNV online order an access at the designated ESA to the first dual-commerce deliverable fulfillment.

68. A system for expediting fulfillments of online ordered dual-commerce available deliverables using expedited-service area (ESA) pickups in specified time-windows and by delivery to specific locations, as selected in a graphical user interface (GUI) present in a display screen of a personal wireless communication (PWC) device, or a handheld PWC device, the system comprising:

a communication network;

at least one networked-computer communicatively coupled to the communication network;

one or more physical deliverable provider networked-venues (DPNV(s)) or DPNV chain, of a respective single venue facility, or multi-venue facility, each open to the general public and a provider of one or more retail deliverables, available for order online for fulfillment by an at-venue pickup within a specified time-window and by a delivery or sending to a specific location;

a PWC device or handheld PWC device accessible software user interface associated with at least a first DPNV operative to present in a graphical user interface on a display of the PWC device dual-commerce available deliverables of an at least first DPNV available for by dual-commerce deliverable fulfillments;

each of one or more of the DPNVs a deliverable provider of at least one deliverable available for order online for fulfillment by at least an at-venue pickup or procurement scheduled to occur within a specified time-window at a respective at least one designated expedited-service area (ESA);

each designated ESA(s) of a DPNV,
- a) allocated by the DPNV indoors or outdoors in at least a subarea location within or adjacent a side of or nearby the DPNV;
- b) designated, indoors or outdoors, in a manner readily discernible to customers at the DPNV;
- c) comprising a standing customer or seated customer area of a size and scheduled customer visit capacity sufficient to provide each of one or more customers at the ESA a respective fulfilment of one or more ESA available deliverables, within one of a sequence of scheduled customer event time-windows making up a flow or flow rate of scheduled ESA visit customers;
- d) located separate from or adjacent one or more areas allocated by the DPNV normally traversed by non-scheduled visit customers each expending time due to a plurality of a search, retrieval, unavailability, not finding, lining up of one or more non-scheduled visit customers waiting to procure and/or pay for, one or more at-venue deliverables; and
- e) including at least one customer interface device accessible to a customer at the ESA within a specified one of a sequence of scheduled customer-event time-windows;

the PWC device or handheld PWC device accessible software user interface operative to present in the graphical user interface on a display of a PWC device of a DPNV customer one or more available deliverables, available for selection in an online order of the DPNV, and for an available deliverable selected in the order, present a choice of at least one of:

a first deliverable fulfilment comprising a pickup or procurement of the available deliverable provided at a designated ESA of the DPNV within a computer determined available customer event time-window schedulable for an ESA visit; and a second deliverable fulfilment comprising a delivery or sending of the available deliverable to a specific location;

the at least one networked-computer operative, taking into account the deliverable(s) selected in the online order for a first deliverable fulfilment, and scheduled and schedulable customer event time-windows for expedited service area visits at the DPNV, to determine the time-window for the deliverable pickup fulfilment or procurement at a designated ESA of the DPNV, wherein, the deliverable pickup fulfilment or procurement at the designated ESA of the DPNV is accessible to the customer within the computer determined time-window, upon as soon as the at least one customer interface device verifying the identity of the customer, or the order for the dual-commerce deliverable(s), or both for the retail dual-commerce available deliverable(s) selected in the online order for the deliverable pickup fulfilment or procurement.

69. The system of claim 68, further comprising:

at least a first ESA customer interface device operative to communicate wirelessly with a handheld PWC device of the DPNV customer at the ESA; wherein, a check-in of the DPNV customer for a first dual-commerce deliverable fulfillment at the ESA, communicated via the wireless communication, verifies at least the identity of the customer at the ESA, or the order for the dual-commerce deliverable(s), or both, substantially at the same time of the wireless check-in: wherein the wireless check-in expedites a deliverable pickup fulfillment at an ESA, by obviating a check-in made by one or more physical inputs and/or interactions of the DPNV customer at, and an expending of a period of time at, one or more ESA customer interface devices.

70. The system of claim 68, further comprising:

an at least one dual-commerce available deliverable represented in the GUI, selected in an online order of the PWC device or the handheld PWC device accessible user interface associated with the DPNV, operative to receive an online pre-payment for one or more retail dual-commerce available deliverables selected in the order prior to a first dual-commerce deliverable pickup fulfillment of the deliverable(s) at an ESA within a specified time-window, wherein the online pre-payment received for the deliverable(s) prior to the pickup fulfillment at the ESA, expedites a deliverable pickup fulfillment of the deliverable(s) by obviating at least one of a cash payment transaction at the DPNV, an at-venue financial transaction at an at least one ESA customer interface device and an expending of a period of time for either transaction.

71. The system of claim 68, further comprising:

at least a first ESA customer interface device operative to communicate wirelessly with a handheld PWC device of the DPNV customer at the ESA; wherein upon an online pre-payment, for one or more retail dual-commerce available deliverables selected in the DPNV online order, received prior to a first dual-commerce deliverable pickup fulfillment at an ESA within a specified time-window; and a check-in of the DPNV customer for a first dual-commerce deliverable pickup fulfillment at an ESA, via the wireless communication, verifies at least the identity of the customer at the ESA, or the order for the dual-commerce deliverable(s), or both, substantially the same time of the wireless communication check-in, wherein the deliverable pickup fulfillment at the designated ESA of the DPNV is accessible to the customer at the ESA substantially the same time of the wireless communication check-in, obviating physical inputs and/or interactions by the customer at one or more ESA customer interface devices and an expending of a period of time for one or more physical device transactions.

72. The system of claim 68, further comprising:

at least a first transceiver at a designated ESA of the DPNV operative to communicate wirelessly with a PWC device of the DPNV customer at the ESA; wherein, a check-in of the DPNV customer for a first dual-commerce deliverable pickup fulfillment at the ESA, accomplished via the wireless communication, verifies at least the identity of the customer at the ESA, or the order for the dual-commerce deliverable(s), or both, substantially at the same time of the wireless check-in, wherein the wireless check-in expedites the deliverable pickup fulfillment of the deliverable(s) provided at the ESA, relative to a check-in by one or more physical inputs and/or interactions made by a customer at one or more ESA customer interface devices and an expending of a period of time for one or more physical device transactions and/or interactions.

73. The system of claim 68, further comprising:
the PWC device or the handheld PWC device accessible user interface associated with the DPNV being operative to receive reported deliverable availability data and present in the GUI on a display of either device at least one dual-commerce available deliverable, available for selection in the user interface for an online order of the DPNV, based on at least one of
a regular updating of venue condition data pertaining to dual-commerce deliverable availability; and
a real-time updating of the deliverable availability data to a current availability occurring substantially at the same time the dual-commerce available deliverable is selected in the user interface for the online order by a first DPNV customer,
wherein the dual-commerce available deliverable is represented available for selection in the user interface to a next DPNV customer substantially at the same time of the regular updating or the real-time updating.

74. The system of claim 68, further comprising:
at least one networked-computer operative to determine a current availability of at least one dual-commerce available deliverable selected by a customer in the online order of the DPNV for the first dual-commerce deliverable pickup fulfillment; and
based on an availability of the selected deliverable determined available by the networked-computer, provide the customer, for the pickup of the deliverable at a designated ESA of the DPNV, within a specified time-window, at least one of a same-day availability, a guaranteed availability.

75. The system of claim 68, further comprising:
a first PWC device accessible software user operative to present, available for selection in a graphical user interface on a display of a PWC device of a DPNV customer, at least one other PWC device accessible software user interface providing access to one or more deliverable category associated DPNVs or facilities each providing at least one of first dual-commerce deliverable fulfillments, or second dual-commerce deliverable fulfillments, or both;
wherein, a deliverable category selectable for an at least one PWC device accessible user interface comprises one of merchandise, activities, services,
wherein upon being selected and presented in a graphical user interface on a display of a PWC device of a DPNV customer,
a merchandise user interface associated with at least one merchandise DPNV or facility or name of either, presents one or more dual-commerce available merchandise deliverables, each available for selection in an online order for a first dual-commerce deliverable pickup fulfillment or a second dual-commerce deliverable fulfillment by a delivery or a sending, or both;
an activities user interface associated with at least one activity(s) DPNV or facility, presents one or more available activity(s), available for selection in an online order, available for a first dual-commerce deliverable fulfillment procurement provided in or at a designated ESA in a DPNV allocated area for standing customers, or seated customers, or both;
a services user interface associated with at least one activity(s) DPNV or facility, presents one or more available service(s), available for selection in an online order, available for a first dual-commerce deliverable fulfillment procurement provided in or at a designated ESA in a DPNV allocated area for standing customers, or seated customers, or both.

76. The system of claim 68, further comprising:
the at least one networked-computer being operative to schedule each of one or more determined schedulable ESA visit time-windows within at least one of
a scheduled plurality of sequential or concurrent and sequential ESA visit time-windows making up a flow or flow rate of customers at a designated ESA; and
a scheduled plurality of sequential or concurrent and sequential ESA visit time-windows making up a flow or flow rate of customers at the ESA at or within the customer visit capacity of the designated ESA.

77. The system of claim 68, wherein
the DPNV is a merchandise DPNV, and present in the GUI is a merchandise venue or store interface which includes at least one of a name, a representation, of the merchandise DPNV, and a plurality of at least current available merchandise items, available for selection in an online order of the merchandise DPNV for one or both of the first and the second dual-commerce deliverable fulfillments;
the at least current available merchandise items categorized according to at least one of: type name of merchandise venue(s), name of merchandise venue(s), type of product(s), product(s) currently available, entertainment content categorized according to one or more of "Hits", "Specials", alphabetized "Artists", film and music genres, product parameters categorized according to one or more of price(s), tax(es), size(s), dimension(s), color(s), product age(s), product year(s), wherein
the merchandise venue or store interface is configured to permit browsing of the categorized merchandise items; and
based on a browsing of one or more of the categorized merchandise items, indicate at least a current available one or more deliverables of the merchandise DPNV available for selection in the online order.

78. The system of claim 68, further comprising the networked-computer being operative to schedule short duration time-windows available for selection in an ESA visit itinerary, comprising a plurality of successive or sequential time-windows for first dual-commerce deliverable fulfillments at a designated ESA of one of more DPNVs, wherein an average time period for each of the plurality of short duration time-windows for a respective ESA deliverable fulfillment, comprises a specified time-window range of minutes not exceeding at least one of a single-digit number of minutes, fifteen minutes, thirty minutes.

79. The system of claim 68, further comprising at least one networked-computer operative to schedule a reserved parking at at least one of a single-facility venue, a multi-venue facility, to occur concurrent with at least one first dual-commerce deliverable pickup fulfillment provided to a customer at a designated ESA of a respective DPNV within a specified ESA visit time-window.

80. The system of claim 68, further comprising the at least one networked-computer operative to query a DPNV customer for a preferred one or more schedules or time-periods within which to arrive at and visit an ESA-equipped DPNV and determine at least one time-window for a visit at the ESA-equipped DPNV within or closest to at least one schedule or time-period preferred by the customer, taking into account one or more deliverable(s) selected for a first dual-commerce deliverable pickup fulfillment, scheduled and schedulable customer event time-windows for expedited service area visits at the DPNV; and schedule one of:
- a determined schedulable time-window within, or
- a determined schedulable time-window closest fitting or closest available to, the at least one schedule or time-period preferred by the customer.

81. The system of claim 68, further comprising:
- a PWC device accessible software user interface associated with at least one ESA equipped DPNV operative to present in a graphical user interface on a display of a GPS equipped mobile PWC device an ESA visit itinerary downloaded to the device;
- the ESA visit itinerary comprising at least one first dual-commerce deliverable fulfillment scheduled to occur within a specified time-window at a designated ESA of the DPNV for a pickup of least one online ordered dual-commerce available deliverable, wherein the designated ESA of the DPNV providing the deliverable pickup fulfillment is the destination of the ESA visit itinerary;
- the mobile PWC device operative to receive scheduled itinerary information communicated via at least one of the internet, one or more ESA wireless transceivers, a wireless network and present itinerary information in the graphical user interface on the display of the PWC device at least in advance of the pickup, comprising deliverable fulfillment related text prompts contextual to the first dual-commerce deliverable pickup fulfillment, wherein
- a first prompt or each of sequential prompts indicates to the customer relative to his or her current position which way to go or proceed to the ESA destination in the downloaded itinerary, providing the first dual-commerce deliverable pickup fulfillment of the online ordered dual-commerce available deliverable, within a specified time-window.

82. The system of claim 68, further comprising:
- at least one of a first customer interface device operative to verify, a customer identity, or order for a first dual-commerce deliverable pickup fulfillment, or both, at a designated ESA within a specified time-window; and
- a second customer interface device operative to receive a payment at the designated ESA within a specified time-window for the order,
- wherein the first customer interface device, or the second customer interface device, or both, include one or more of the following:
- a networked-computer equipped with a display and graphical user interface, a computer-interfaced keyboard, a computer-interfaced keypad, a PIN entry device, an electronic-signature pad, a magnetic card-strip reader, a financial transaction card reader of one or more of financial transaction card information, credit card information, membership card information, at least one customer interface device operatively communicating with the handheld PWC device at the ESA via one or more of infrared, Bluetooth, radio wave, frequencies or frequency ranges.

83. The system of claim 68, further comprising:
- a dual-commerce merchandise DPNV identified with a name, and a first merchandise DPNV user interface associated with the dual-commerce merchandise DPNV and name;
- the first merchandise DPNV user interface being operative to present in a graphical user interface (GUI) on a display of a mobile PWC device of a user, a first collection of merchandise deliverables including ones available for selection in an online order of the dual-commerce merchandise DPNV for at least second dual-commerce deliverable fulfillments; wherein,
- the first merchandise DPNV user interface and first selection of merchandise deliverables presented in response to the first merchandise user interface being selected in the GUI on the display of PWC device by the user; and, upon being displayed in the GUI the first DPNV user interface presents options in the user interface for accessing other types of merchandise deliverables available for first dual-commerce deliverable fulfillments, or second dual-commerce deliverable fulfillments, or both;
- dual-commerce merchandise fulfillments of online orders received by the dual-commerce merchandise DPNV comprise at least one chain of physical merchandise single venue facilities of the dual-commerce merchandise DPNV, wherein each of a plurality of the single venue facilities provides pickups in scheduled time-windows at an at least one respective designated ESA, distinct from one or more other areas allocated for at-venue retail merchandise searching, retrieval and purchasing of products or goods by walk-in customers;
- access in the first merchandise DPNV user interface to the chain of single venue facilities and/or to one or more other dual-commerce DPNVs, is provided by an interface to one or more venues or stores, each a provider of respective first and second dual-commerce deliverable fulfillments;
- deliverables of the dual-commerce merchandise DPNV further comprise dual-commerce available digital entertainment content and media each available for selection in an online order of the DPNV, wherein
- the dual-commerce merchandise DPNV user interface operable on the PWC device provides:
- browsing of dual-commerce available deliverables by one or more deliverable type(s), type of product(s), products currently available, name of the dual-commerce merchandise DPNV, price(s), tax(es), product size(s), product dimension(s), product(s) age or year, product(s) color; and,
- browsing of digital entertainment content by one or more of title, genre, artist, production company; and provides,
- previewing of digitally-recorded content and entertainment content deliverables available for streaming, comprising streaming audio content and streaming video content; and,
- indicate, available for selection in the user interface, at least one of one or more dual-commerce available deliverables, one or more digital entertainment content deliverables, available for selection in an online order of the dual-commerce merchandise DPNV, for first or second dual-commerce deliverable fulfillments, or both,
- wherein digital entertainment content deliverables available for selection in the online order comprise one or more of streaming video, streaming audio, digital media or digital media in a compressed digital format downloadable to a PWC device of a customer, retail packaged digital media content in optical disc formats available in different video resolution qualities.

84. The system of claim 68, further comprising:
- one or more scalable designated ESA(s) of the at least one DPNV, each scalable in size and customer visit capacity to one or more expanded scale states, and to one or more contracted scale states, taking into account an increased or a decreased plurality of concurrent scheduled time-windows, or sequential scheduled time-windows, or both, determined by an at least one networked-computer, for first dual-commerce deliverable pickup fulfillments at the one or more scalable designated ESA(s); wherein, a scalable designated ESA scaled to an expanded state incorporates an increased number of one or more networked customer interface stations at a DPNV, each accessible for a first dual-commerce deliverable pickup fulfillment selected by a respective customer in an online order of the DPNV; and, scaled to a contracted state incorporates a decreased number of the one or more customer interface stations at the DPNV accessible for a first dual-commerce deliverable pickup fulfillment and a respective first dual-commerce deliverable pickup fulfillment;

each customer interfacing station including a respective plurality of customer interface devices;

each one or more scalable designated ESA station including a customer interface station and a respective plurality of customer interface devices.

85. The system of claim 84, wherein at least one customer interface device of at least one of the customer interfacing station, the scalable designated ESA station, is operative, within or adjacent the at least one scalable designated ESA within a specified ESA visit time-window for a first dual-commerce deliverable fulfillment, and includes one or more of:

a networked-computer equipped with a display and graphical user interface, a computer-interfaced keyboard, a computer-interfaced keypad, a PIN entry device, an electronic-signature pad, a magnetic card-strip reader, a financial transaction card reader of one or more of financial transaction card information, credit card information, membership card information, at least one customer interface device operatively communicating with the handheld PWC device at the ESA via one or more of infrared, Bluetooth, radio wave, frequencies or frequency ranges.

86. The system of claim 68, further comprising:

at least one DPNV allocated designated ESA of a given size and scheduled customer visit capacity, or a designated ESA scalable in size and scheduled customer visit capacity of a DPNV, being operative to fulfill dual-commerce deliverable pickup fulfillments to customers on a one-customer-at-a-time basis for at least one of a sequential plurality of first dual-commerce deliverable pickup fulfillments each provided to a respective scheduled ESA visit customer within a distinct specified time-window; and, a sequential plurality of dual-commerce deliverable procurements each provided to a respective non-scheduled visit customer.

87. The system of claim 68, further comprising:

an at least one networked-computer operative to determine for a downloadable ESA visit itinerary of a DPNV of a single-facility venue or a multi-venue facility, at least one ESA visit time-window for a first dual-commerce deliverable pickup fulfillment at a designated ESA, wherein the DPNV-designated ESA providing the deliverable pickup fulfillment is the destination of the ESA visit itinerary; and wherein, the ESA itinerary downloaded to a mobile PWC device of a customer of the DPNV, comprises the ESA visit itinerary of the DPNV received by a mobile PWC device comprising a screen display, graphical user interface and GPS, at least in advance of the deliverable pickup fulfillment provided at the designated ESA.

88. The system of claim 87, further comprising:

the downloaded ESA visit itinerary presented in the graphical user interface (GUI) on the display of the mobile PWC device of the customer at least in advance of the deliverable pickup fulfillment at the designated ESA;

scheduled itinerary information communicated to the mobile PWC device via at least one of the internet, one or more transceivers, a wireless network; and, represented in the GUI, a current location of the DPNV customer relative to the itinerary DPNV-designated ESA destination of the single-facility DPNV, or a multi-venue facility DPNV, wherein such facilities comprise areas indoors and/or outdoors traversed by customers; wherein, the representation comprises graphically or pictorially representing instructions to direct the customer, at or within one or more facility(s) and one or more areas thereof, by one or more of photographs, diagrams, maps, graphical elements, arrows, graphical depictions, to indicate which way he or she should proceed relative to their current position to the DPNV-designated ESA destination; and providing the first dual-commerce deliverable pickup fulfillment to the customer within a scheduled ESA visit time-window at the DPNV-designated ESA destination.

89. The system of claim 68, further comprising:

the GUI, present on a display of the PWC device or the handheld PWC device, including a first user interface a representation of at least one of a first DPNV, the DPNV chain, a name of the DPNV, or each of the chain of DPNVs, operative to present in a graphical user interface on a display of a PWC device dual-commerce available deliverables of a merchandise category of products or goods, available for first dual-commerce deliverable pickup fulfillments within specified time-windows at respective designated ESAs, and available for second dual-commerce deliverable fulfillments by a delivery or sending to a specific location;

the first user interface operative to present on a display of the PWC device to the user a choice of at least two different deliverable category type DPNV user interfaces, each available for selection in the first user interface and associated with a respective at least one ESA-equipped DPNV in accordance with a primary category of deliverable(s) fulfilled by the DPNV;

a first deliverable-category user interface operative upon being selected, to present to the user on the display of the PWC device at least one available deliverable of a first deliverable-category DPNV available for selection in an online order;

at least a second deliverable-category user interface operative upon being selected, to present to the user on the display of the PWC device at least one available primary deliverable of an at least second deliverable-category DPNV available for selection in an online; and at least one networked-computer operative, based on a selecting by the user of at least one deliverable in each of at least two different deliverable-category DPNV user interfaces, for the online order, to:

consolidate the deliverables selected in the different user interfaces into a single online order procedure; and present to the user a choice to fulfill the consolidated order by a selecting of at least one of,
a first dual-commerce deliverable fulfillment comprising a pickup or procurement at a respective ESA within a networked-computer determined time-window; and
a second dual-commerce deliverable fulfillment comprising a delivery or sending of the selected deliverable(s) to a specific location.

90. The system of claim 89, wherein a choice presented in the first user interface on the display of the PWC device of at least two different deliverable-category DPNV user interfaces available for selection, comprises:
the first user interface being operative to present on the display of the PWC device for selection by the user a choice of at least two of:
an interface to one or more merchandise DPNVs, an interface to one or more activities DPNVs, an interface to one or more services DPNVs.

91. The system of claim 68, further comprising:
the at least one networked-computer communicatively coupled with at least one database including a store of data and updated data pertaining to at least one of first dual-commerce deliverable fulfillments, second dual-commerce deliverable fulfillments, of at least one of an online represented single venue facility DPNV or multi-venue facility DPNV; and
one or more of the software routines executable by the at least one networked-computer(s), that when executed, cause the computer(s) to record or update data pertaining to at least one of the first dual-commerce deliverable fulfillments, the second dual-commerce fulfillments, wherein the data recorded or updated by the computer(s) pertains to at least one of:
one or more customer-orders for deliverables of at least one online represented DPNV fulfilled by at least one of a first dual-commerce deliverable fulfillment, a second dual-commerce fulfillment;
a plurality of online orders of different online represented DPNVs for at least one of a first dual-commerce deliverable fulfillment, a second dual-commerce fulfillment, consolidated into a single online order; and
a use by a customer of at least one of a designated ESA customer interface device during a first dual-commerce deliverable fulfillment including at least one of one or more ESA transactions, one or more ESA customer interactions, at the at least one online represented single venue facility DPNV or multi-venue facility DPNVs.

92. The system of claim 68, wherein a verification, made by an at least first customer interface device at a designated ESA within a specified time-window, of a customer identity, or order for a first dual-commerce deliverable fulfillment, or both, includes a use of one or more of:
a computer-interfaced keyboard, a computer-interfaced keypad, a PIN entry keypad, an electronic-signature pad, a magnetic card-strip reader, a financial transaction card reader of one or more of financial transaction card information, credit card information, membership card information, at least one customer interface device operatively communicating with the handheld PWC device at the ESA via at least one of infrared, Bluetooth, radio wave, frequencies or frequency ranges.

93. The system of claim 68, further comprising:
one or more itineraries each including one or more specified time-windows each scheduled for a respective first dual-commerce deliverable fulfillment at a designated ESA of a DPNV, and each itinerary, while in use or prior to use by a respective customer, including at least one specified time-window capable of being rescheduled; and
ordering, reservation and scheduling apparatus communicatively coupled with at least one of one or more handheld PWC device(s), one or more venue-based display screen equipped networked-computer(s), and further coupled with one or more database including data pertaining to current scheduled customer-event time-windows and schedulable customer-event time-windows of a respective one or more DPNVs;
the ordering, reservation and scheduling apparatus including at least one networked-computer and software instructions executable by the networked computer(s) that when executed cause the computer(s) to:
reschedule at least one scheduled time-window of one or more of the itineraries, based at least in part on, at least one real-time request for a rescheduling, received over a wireless network from at least one of the one or more handheld PWC device(s), the one or more display screen equipped networked-computer(s), and data pertaining to the current scheduled and schedulable customer-event time-windows,
wherein one or more real-time requests for an itinerary time-window rescheduling include at least one of:
a request for a break to be scheduled prior to one of, or intermediate, a plurality of scheduled time-windows of an itinerary,
a request to expand a scheduled time-window duration of an itinerary,
a request from each of at least a first customer and a second customer of a DPNV to mutually swap at least one scheduled time-window of an itinerary of the first customer with at least one scheduled time-window of an itinerary of the second customer; and
present, upon at least one of the real-time requests being received, one or more time-window rescheduling options, selectable in a display screen of at least one of the one or more handheld PWC device(s), the one or more display screen equipped networked-computer(s).

94. The system of claim 68, wherein
a plurality of dual-commerce available deliverables selected in the GUI for an online order of the DPNV, comprises:
one or more dual-commerce available deliverables of the DPNV selected in the online order for a first dual-commerce deliverable fulfillment including at least one of a deliverable pickup, a deliverable access, provided at a designated ESA;
one or more dual-commerce available deliverables of the DPNV selected in the online order for a second dual-commerce deliverable fulfillment including at least one delivery; and
at least one networked-computer configured to facilitate dual-commerce deliverable ordering and fulfillments employed to consolidate the online order for the plurality of the dual-commerce deliverables selected in the GUI, into a single online order.

95. The system of claim 68, further comprising:
a representation, in the GUI, of the DPNV including a name of the DPNV and one or more current available dual-commerce deliverables available for selection in the online order of the DPNV; and the GUI configured to permit browsing of current available dual-commerce deliverable(s) by one or more categories, including one or more of: product type(s), product(s) model, product(s) price, product(s) tax, product(s) currently available, product size(s), product dimension(s), product(s) shape, product(s) age, product(s) color and allow a user to select one or more retail dual-commerce deliverables from one or more of the categories, for the online order.

96. The system of claim 68, further comprising:
a multiple media representation of one or more of the current available retail dual-commerce retail deliverables available for selection, in the online order, for a first dual-commerce deliverable fulfillment and a second dual-commerce deliverable fulfillment, wherein the representation employs both online compatible media and transmissible media including at least two of: instant messaging, email, text, digital video files, digital audio files, computer-storable files, photographs, faxes, graphical depictions, line art.

97. The system of 68 further cemprising a customer interface device at a designated ESA operable to receive a code, asscciated with a DPNV online order including a first dual-commerce deliverable fulfillment, and in response to the code being received by the customer interface device permit a customer of the DPNV online order an access at the designated ESA to the first dual-commerce deliverable fulfillment.

98. The system of claim 68 further comprising:
a muiti-DPNV itinerary including a sequence of ESA visits wherein each ESA visit is scheduled for a respective one of a plurality of DPNVs of different locations;
each sequenced ESA visit scheduled in a distinct time-window tor a first dual commerce deliverable fulfillment at a designated ESA of a respective DPNV;
each distinct time-window of the multi-DPNV itinerary determined by the at least one networked-computer, based at least in part on one or more online represented dual-commerce available deliverables of a respective DPNV being selected in an online order, and data pertaining to scheduled and schedulable ESA visits on the DPNVs; and
the multi-DPNV itinerary, present in a GUI in a display of a GPS-equipped PWC device or GPS-equipped handheld PWC device at least in advance of an upcoming one or more at the sequenced ESA visits.

99. The system of claim 98, further comprising the multi-DPNV itinerary including in the GUI in the display of the GPS-equipped PWC device or GPS-equipped handheld PWC device, for at least one of the plurality of DPNVs, navigational instructions that direct a customer, relative to their current location, to at least ohe of the DPNVs.

100. A system for expediting fulfillments of online ordered dual-commerce available deliverables using expedited-service area (ESA) pickups in specified time-windows and by delivery to specific locations, as selected in a graphical user interface (GUI) present in a display screen of a personal wireless communication (PWC) device, or a handheld PWC device, the system comprising:
a communication network;
at least one networked-computer communicatively coupled to the communication network;
one or more physical deliverable provider networked-venues (DPNVs) or DPNV(s) of a DPNV chain, each open to the general public and a provider of one or more retail deliverables, available for order online for fulfillment by at-venue pickups within a specified time-window and by a delivery or sending of the deliverable(s) to a specific location;
each of one or more of the DPNVs comprising a respective one or more designated expedited-service areas (ESAs) where at-venue scheduled pickups of one or more online ordered retail dual-commerce available deliverables are provided;
one or more designated ESAs of a DPNV,
  a) allocated by the DPNV indoors or outdoors in at least one of a subarea location within, adjacent a side of, separate from and near to the DPNV, or adjacent a retail deliverable fulfillment structure;
  b) designated, indoors or outdoors, in a manner readily discernible to customers at the DPNV, a designating comprising one or more of indicia, a coloring, an ESA area, a scalable boundary;
a personal wireless communication (PWC) device or a handheld PWC device accessible software user interface associated with at least one DPNV communicatively coupled with a store of data and updated data including data pertaining to retail deliverable availability, the software user interface operative to present in the GUI in a display of either PWC device a current available one or more retail dual-commerce deliverables, available for selection in an online order of the DPNV, and allow the user to select an available one or more of the deliverables in the online order for at least one of,
a first dual-commerce deliverable fulfillment comprising a pickup of a selected one or more of the retail deliverables provided at a designated ESA of the DPNV within one of a scheduled sequence of customer event time-windows making up a flow or flow rate of ESA visit customers; and,
a second dual-commerce deliverable fulfilment comprising a delivery or sending of a selected one or more of the retail deliverables to a specific location;
at least one networked-computer and software routines executable by the networked-computer that when executed cause the computer to determine at least one time-window for a deliverable pickup fulfillment at a designated ESA of the DPNV, based at least in part on the retail deliverable(s) selected in the online order for a first dual-commerce deliverable fulfillment and scheduled and schedulable customer event time-windows for ESA visits at the DPNV;
at least one deliverable fulfillment structure allocated by the DPNV within, adjacent a side of, or separate and near to the DPNV and incorporated within the structure
an array of retail merchandise receptacles adjacent a designated ESA, or
a plurality of laterally disposed retail merchandise reception bins adjacent a designated ESA, or both,
an interior volume of each receptacle and/or bin of sufficient capacity to receive at least one online ordered dual-commerce available deliverable inserted therein, available for a first dual-commerce deliverable fulfillment, wherein the deliverable(s) inserted into one or more of the receptacles or bins are inaccessible to non-ESA visit customers and passersby exterior to the ESA;
the at least one deliverable fulfillment structure comprising at least one customer interface station located on an upright portion of an exterior side of the structure at or within, and facing, an adjacent designated ESA;
a first customer interface device of a designated ESA or customer interface station operative to verify at least one of a customer identity, an order pertaining to a deliverable pickup fulfillment, a code associated with an order for a deliverable pickup fulfillment; and a second customer interface device of the designated ESA or customer interface station operative to receive an at-venue payment pertaining to a deliverable pickup fulfilment;

wherein, a deliverable pickup fulfillment at a designated ESA or customer interface station is accessible to a customer within the computer determined time-window, upon as soon as at least the first customer interface device verifying at least one of the customer identity, the order pertaining to a deliverable pickup fulfillment, the code associated with the order for the deliverable pickup fulfillment.

101. The system of claim 100, further comprising:

at least one of a transceiver, a first ESA customer interface device, and at least one handheld PWC device of a DPNV customer at the ESA, wherein a check-in of the DPNV customer for a first dual-commerce deliverable pickup fulfillment at the ESA, communicated via the wireless communication, verifies at least the identity of the customer at the ESA, or the order for the dual-commerce, deliverable(s), or both, substantially at the same time of the wireless check-in, and wherein the wireless check-in expedites a deliverable pickup fulfillment at an ESA, by obviating a check-in made by one or more physical inputs and/or interactions of the DPNV customer at, and an expending of a period of time at, one or more ESA customer interface devices.

102. The system of claim 100, further comprising:

an at least one available deliverable represented in the GUI selected in an online order of a PWC device or a handheld PWC device accessible user interface associated with a DPNV operative to receive an online pre-payment for one or more retail dual-commerce available deliverables selected in the order prior to a first dual- deliverable pickup fulfillment or procurement of the deliverable(s) at an ESA within a specified time-window, and wherein the online pre-payment received for the deliverable(s) prior to the pickup fulfillment at the ESA, expedites a deliverable pickup fulfillment of the deliverable(s) by obviating at least one of a cash payment transaction at the DPNV, an at-venue financial transaction at the at least one ESA customer interface device and an expending of a period of time for either transaction.

103. The system of claim 102, further comprising:

at least a first ESA customer interface device operative to communicate wirelessly with a handheld PWC device of a DPNV customer at the ESA; wherein upon an online pre-payment, for one or more retail dual-commerce available deliverables selected in the DPNV online order, received prior to a first dual-commerce deliverable pickup fulfillment at an ESA within a specified time-window;

a check-in of the DPNV customer for a first dual-commerce deliverable pickup fulfillment at an ESA, via the wireless communication, verifies at least the identity of the customer at the ESA, or the order for the dual-commerce deliverable(s), or both, substantially the same time of the wireless communication check-in; and the deliverable pickup fulfillment at the designated ESA of the DPNV is accessible to the customer at the ESA substantially the same time of the wireless communication check-in, obviating physical inputs and/or interactions by the customer at one or more ESA customer interface devices and an expending of a period of time for one or more physical device transactions.

104. The system of claim 100, further comprising:

at least a first transceiver at a designated ESA of the DPNV operative to communicate wirelessly with a PWC device of a DPNV customer at the ESA, wherein a check-in of the DPNV customer for a first dual-commerce deliverable pickup fulfillment at the ESA, accomplished via the wireless communication, verifies at least the identity of the customer at the ESA, or the order for the dual-commerce deliverable(s), or both, substantially at the same time of the wireless check-in, and wherein the wireless check-in expedites the deliverable pickup fulfillment of the deliverable(s) provided at the ESA, relative to a check-in by one or more physical inputs and/or interactions made by a customer at one or more ESA customer interface devices and an expending of a period of time for one or more physical device transactions and/or interactions.

105. The system of claim 100, further comprising:

the PWC device or the handheld PWC device accessible user interface associated with the DPNV being operative to receive reported deliverable availability data and represent in the GUI at least one dual-commerce available deliverable, available for selection in the user interface for an online order of the DPNV, based on at least one of a regular updating of venue condition data pertaining to dual-commerce deliverable availability; and a real-time updating of the deliverable availability data to a current availability occurring substantially at the same time the dual-commerce available deliverable is selected in the user interface for the online order by a first DPNV customer, wherein the dual-commerce available deliverable is represented available for selection in the user interface to a next DPNV customer substantially at the same time of the regular updating or the real-time updating.

106. The system of claim 100, further comprising:

at least one networked-computer operative to determine a current availability of at least one dual-commerce available deliverable selected by a customer in the online order of the DPNV for the first dual-commerce deliverable pickup fulfillment; and based on an availability of the selected deliverable determined available by the networked-computer, provide the customer, for the pickup of the deliverable at a designated ESA of the DPNV, within a specified time-window, at least one of a same-day availability, a guaranteed availability.

107. The system of claim 100, further comprising:

a designated ESA allocated by the DPNV at one of the subarea location within or adjacent a side of, the area separate and near to, the DPNV, available for scheduling as an ESA visit itinerary destination for a first dual-commerce deliverable fulfillment provided to a customer;

a networked-computer determined available time-window scheduled for the first dual-commerce deliverable fulfillment, provided in an ESA visit itinerary, wherein the designated ESA scheduled to provide the first dual-commerce deliverable fulfillment to a customer at the DPNV is the itinerary destination; and the first dual-commerce deliverable pickup fulfillment provided to the customer at the designated ESA within the networked-computer determined time-window, provides an itinerary single-destination, obviating a need for the customer to enter, traverse or encounter delays in one or more of the areas allocated by the DPNV for non-scheduled visit customers, reducing time spent by the customer at the DPNV.

108. The system of claim 100, further comprising:
the at least one networked-computer being operative to schedule each of one or more determined schedulable ESA visit time-windows within at least one of
a scheduled plurality of sequential or concurrent and sequential ESA visit time-windows making up a flow or flow rate of customers at a designated ESA; and,
a scheduled plurality of sequential or concurrent and sequential ESA visit time-windows making up a flow or flow rate of customers at the ESA at or within the customer visit capacity of the designated ESA.

109. The system of claim 100, wherein the at least one of a subarea location within or adjacent a side of the retail DPNV comprises an at least one subarea location adjacent an exterior side of DPNV, or area separate from and near to the DPNV, or both; wherein one or more designated ESA(s) are located by the DPNV in at least one of an indoor area, and, an outdoor area.

110. The system of claim 100, further comprising:
at least one DPNV allocated designated ESA of a given size and scheduled customer visit capacity, or a designated ESA scalable in size and scheduled customer visit capacity of a DPNV, operative to fulfill dual-commerce deliverable pickup fulfillments to customers on a one-customer-at-a-time basis for at least one of
a sequential plurality of first dual-commerce deliverable pickup fulfillments each provided to a respective scheduled ESA visit customer within a distinct specified time-window; and
a sequential plurality of dual-commerce deliverable procurements each provided to a respective non-scheduled visit customer.

111. The system of claim 100, further comprising at least one networked-computer operative to schedule a reserved parking at least one ESA-equipped DPNV, to occur concurrent with at least one first dual-commerce deliverable pickup fulfillment at the designated ESA of the DPNV within a specified ESA visit time-window.

112. The system of claim 100, further comprising:
the at least one networked-computer operative to query a DPNV customer for a preferred one or more schedules or time-periods within which to arrive at and visit an ESA-equipped DPNV and determine at least one time-window for a visit at the ESA-equipped DPNV within or closest to at least one schedule or time-period preferred by the customer, taking into account one or more deliverable(s) selected for a first dual-commerce deliverable pickup fulfillment, scheduled and schedulable customer event time-windows for expedited service area visits at the DPNV; and
schedule one of:
a determined schedulable time-window within, or
a determined schedulable time-window closest fitting or closest available to, the at least one schedule or time-period preferred by the customer.

113. The system of claim 100, further comprising:
a PWC device accessible software user interface associated with at least one ESA equipped DPNV operative to present in a graphical user interface on a display of a GPS equipped mobile PWC device an ESA visit itinerary downloaded to the device;
the ESA visit itinerary comprising at least one first dual-commerce deliverable fulfillment scheduled to occur within a specified time-window at a designated ESA of the DPNV for a pickup of least one online ordered dual-commerce available deliverable, wherein the designated ESA of the DPNV providing the deliverable pickup fulfillment is the destination of the ESA visit itinerary;
the mobile PWC device operative to receive scheduled itinerary information communicated via at least one of the internet, one or more ESA wireless transceivers, a wireless network and present itinerary information in the graphical user interface on the display of the PWC device at least in advance of the pickup, comprising deliverable fulfillment related text prompts contextual to the first dual-commerce deliverable pickup fulfillment,
wherein a first prompt or each of sequential prompts indicates to the customer relative to his or her current position which way to go or proceed to the ESA destination in the downloaded itinerary, providing the first dual-commerce deliverable pickup fulfillment of the online ordered dual-commerce available deliverable, within a specified time-window.

114. The system of claim 100, further comprising at least one of:
an at least first customer interface device operative to verify a customer identity, or order for a first dual-commerce deliverable pickup fulfillment, or both, at a designated ESA within a specified time-window; and
an at least one customer interface device operative to receive a payment at the designated ESA within a specified time-window for the order,
wherein the at least first customer interface device, or the at least one customer interface device, or both, comprise one or more of the following:
a networked-computer including a display and graphical user interface, a computer-interfaced keyboard, a computer-interfaced keypad, a PIN entry device, an electronic-signature pad, a magnetic card-strip reader, a financial transaction card reader operative to read one or more of financial transaction card information, credit card information, membership card information, at least one device operative to communicate wirelessly with the PWC device of the customer at the ESA via one or more of infrared, Bluetooth, radio wave, frequencies or frequency ranges.

115. The system of claim 100, further comprising:
a dual-commerce merchandise DPNV identified with a name, and a first merchandise DPNV user interface associated with the dual-commerce merchandise DPNV and name;
the first merchandise DPNV user interface being operative to present in a graphical user interface (GUI) on a display of a mobile PWC device of a user, a first collection of merchandise deliverables including ones available for selection in an online order of the DPNV for at least second dual-commerce deliverable fulfillments,
wherein the first merchandise DPNV user interface and first selection of merchandise deliverables presented in response to the first merchandise user interface being selected in the GUI on the display of PWC device by the user; and, upon being displayed in the GUI the first DPNV user interface presents options in the user interface for accessing other types of merchandise deliverables available for first dual-commerce deliverable fulfillments, or second dual-commerce deliverable fulfillments, or both;
  dual-commerce merchandise fulfillments of online orders received by the merchandise DPNV comprise at least one chain of physical merchandise single venue facilities of the merchandise DPNV, wherein each of a plurality of the single venue facilities provides pickups in scheduled time-windows at an at least one respective designated ESA, distinct from one or more other areas allocated for at-venue retail merchandise searching, retrieval and purchasing of products or goods by walk-in customers;
  access in the first merchandise DPNV user interface to the chain of single venue facilities and / or to one or more other dual-commerce DPNVs, is provided by an interface to one or more venues or stores, each a provider of respective first and second dual-commerce deliverable fulfillments;
  deliverables of the dual-commerce merchandise DPNV further comprise dual-commerce available digital entertainment content and media each available for selection in an online order of the DPNV; wherein,
  the dual-commerce merchandise DPNV user interface operable on the PWC device provides:
  browsing of dual-commerce available deliverables by one or more deliverable type(s), type of product(s), products currently available, name of merchandise DPNV, price(s), tax(es), product size(s), product dimension(s), product(s) age or year, product(s) color; and,
  browsing of digital entertainment content by one or more of title, genre, artist, production company; and provides,
  previewing of digitally-recorded content and entertainment content deliverables available for streaming, comprising streaming audio content and streaming video content; and,
  indicate, available for selection in the user interface, at least one of one or more dual-commerce available deliverables, one or more digital entertainment content deliverables, available for selection in an online order of the merchandise DPNV, for first or second dual-commerce deliverable fulfillments, or both; wherein,
  digital entertainment content deliverables available for selection in the online order comprise one or more of streaming video, streaming audio, digital media or digital media in a compressed digital format downloadable to a PWC device of a customer, retail packaged digital media content in optical disc formats available in different video resolution qualities.

116. The system of claim 100, further comprising:
  at least one scalable designated ESA of the DPNV, scalable in size and customer visit capacity to one or more expanded scale states, and to one or more contracted scale states, taking into account an increased or a decreased plurality of concurrent scheduled time-windows, or sequential scheduled time-windows, or both, determined by an at least one networked-computer for first dual-commerce deliverable pickup fulfillments at the ESA; wherein, an at least one scalable designated ESA
  scaled to an expanded state incorporates an increased number of one or more networked customer interface stations at a DPNV, each accessible for a first dual-commerce deliverable pickup fulfillment selected by a respective customer in an online order of the DPNV; and
  scaled to a contracted state incorporates a decreased number of the one or more customer interface stations at the DPNV accessible for a first dual-commerce deliverable pickup fulfillment and a respective first dual-commerce deliverable pickup fulfillment;
  each one or more scalable designated ESA comprising an interface station and a respective plurality of customer interface devices; wherein,
  the scalable designated ESA is scalable to each of different scaled states independent of the scalable designated ESA interface station.

117. The system of claim 116, wherein
  the at least first customer interface device of a networked-venue customer interface station, or the at least one networked customer interface device of the station, or both, being operative within or adjacent the at least one scalable designated ESA for a first dual-commerce deliverable fulfillment, comprise one or more of:
  a networked-computer equipped with a display and graphical user interface, a computer-interfaced keyboard, a computer-interfaced keypad, a PIN entry device, an electronic-signature pad, a magnetic card-strip reader, a financial transaction card reader operative to read one or more of financial transaction card information, credit card information, membership card information, at least one device operative to communicate wirelessly with the PWC device of the customer at the ESA via one or more of infrared, Bluetooth, radio wave, frequencies or frequency ranges.

118. The system of claim 100, further comprising the at least one networked-computer being operative to schedule each of one or more determined schedulable ESA visit time-windows within at least one of a scheduled plurality of sequential or successive ESA visit time-windows making up a flow or flow rate of customers at a designated ESA; and
  a scheduled plurality of sequential or successive ESA visit time-windows making up a flow or flow rate of customers at the ESA at or within the customer visit capacity of the designated ESA.

119. The system of claim 100, further comprising:
  an at least one networked-computer operative to determine for a downloadable ESA visit itinerary of a DPNV of a single-facility venue or a multi-venue facility, at least one ESA visit time-window for a first dual-commerce deliverable pickup fulfillment at a designated ESA, wherein the destination of the ESA visit itinerary is at least one of the DPNV, a designated ESA of the DPNV, providing the deliverable pickup fulfillment, wherein the ESA itinerary downloaded to a mobile PWC device of a customer of the DPNV, comprises the ESA visit itinerary of the DPNV received by a mobile PWC device comprising a screen display, graphical user interface and GPS, at least in advance of the deliverable pickup fulfillment at the designated ESA.

120. The system of claim 119, further comprising:
  the downloaded ESA visit itinerary presented in the graphical user interface (GUI) on the display of the mobile PWC device of the customer at least in advance of the deliverable pickup fulfillment at the designated ESA;
  scheduled itinerary information communicated to the mobile PWC device via at least one of the internet, one or more transceivers, a wireless network; and,
  represented in the GUI, a current location of the DPNV customer relative to the itinerary DPNV-designated ESA destination of the single-facility DPNV, or a multi-venue facility DPNV, wherein such facilities comprise areas indoors and/or outdoors traversed by customers; wherein, the representation comprises:

graphically or pictorially representing instructions to direct the customer, at or within one or more facility(s) and one or more areas thereof, by one or more of photographs, diagrams, maps, graphical elements, arrows, graphical depictions, to indicate which way he or she should proceed relative to their current position to the DPNV-designated ESA destination; and providing wherein the first dual-commerce deliverable pickup fulfillment is made accessible to the customer within a scheduled ESA visit time-window at the DPNV-designated ESA destination.

121. The system of claim 100, further comprising at least one retail deliverable optical scanning apparatus operative within the ESA adjacent deliverable fulfillment structure to optically scan at least a portion of an online ordered retail dual-commerce available deliverable placed interiorly within the deliverable fulfillment structure for a subsequent first dual-commerce deliverable pickup fulfillment at the ESA in a specified time-window, and determine by an optical scanning at least one deliverable condition relating to a storing of the deliverable within the structure.

122. The system of claim 100, further comprising an at least one networked-computer operative to schedule each of a plurality of first dual-commerce deliverable pickup fulfillments to occur in respective ESA visit time-windows at one or more of a single, a plurality of separate or laterally disposed, or a series of laterally disposed, designated ESA(s) of a given, or scalable, size and scheduled customer visit capacity, at least one DPNV, taking into account the deliverable(s) selected in an online order for each first dual-commerce deliverable fulfillment, and scheduled and schedulable customer event time-windows for expedited service area visits at the at least one DPNV, wherein the plurality of first dual-commerce deliverable pickup fulfillments, each scheduled to occur in a respective ESA visit time-window comprise one or more of concurrent, sequential, back-to-back, ESA visit time-windows making up a flow or flow rate of customers at the designated ESA(s), or a flow or flow rate at or within a scheduled customer visit capacity of the designated ESA(s).

123. The system of claim 100, wherein an at least first customer interface device operative to verify at a designated ESA within a specified time-window a customer identity, or order for a first dual-commerce deliverable pickup fulfillment, or both, comprises one or more of:

a computer-interfaced keyboard, a computer-interfaced keypad, a PIN entry keypad, an electronic-signature pad, a magnetic card-strip reader, a financial transaction card reader operative to read one or more of financial transaction card information, credit card information, membership card information, at least one device operative for wireless communication in one or more of infrared, Bluetooth, radio wave, frequencies or frequency ranges.

124. The system of claim 100, further comprising:

the array of retail merchandise receptacles enclosed within a 360-degree deliverable fulfillment structure adjacent a designated ESA of a given size or scalable in size and scheduled customer visit capacity, wherein the retail merchandise receptacles of the array are laterally and vertically disposed principally about a periphery of an inwardly facing side of the 360-degree structure such that a merchandise receiving end for each of a respective one of the receptacles faces inwardly toward a center axis of the structure;

the 360-degree deliverable fulfillment structure comprising on an upright exterior portion facing the adjacent designated ESA at least one networked customer interface station or bay and adjacent or proximate an at least one station or bay, accessible to an identity confirmed customer at least one merchandise reception bin operative to provide at least a first dual-commerce deliverable pickup fulfillment of at least one purchased or rented item of retail merchandise, product or goods;

a pick-and-place apparatus comprising a gripping device operative to move laterally and vertically within the confines of the 360-degree structure, in response to computer motion control actuations wherein movements of the pick-and-place apparatus and gripping device comprise movement a) to or from any empty receptacle or retail merchandise occupied receptacle of the array within proximity sufficient for the gripping device to align with a given empty receptacle insert retail merchandise therein and release it, and align with retail merchandise in a given receptacle, grip the merchandise and remove it therefrom; wherein, the movement in inserting retail merchandise into a receptacle and the movement in removing retail merchandise from a receptacle, for at least a first dual-commerce deliverable fulfillment(s), each comprise moving the retail merchandise in alignment with a merchandise receiving end and an axis aligned with the receptacle;

b) from any receptacle of the array, at which at least one item of retail merchandise is removed by the gripping device, to a receiving end or side of a merchandise reception bin passageway; wherein upon, the gripping device aligning with the passageway and releasing the retail merchandise therein, a first dual-commerce deliverable pickup fulfillment, following a received payment, is accessible to a respective identity confirmed customer at the merchandise reception bin, within a specified time-window.

125. The system of claim 124, wherein one or more dual-commerce available deliverables moved by a pick-and-place apparatus and gripping device to a respective one or more merchandise receptacles, available for selection in an online order of the merchandise DPNV, provide at least one of:

a stocking, a replenishing of an inventory of at-venue dual-commerce available deliverables, a store of one or more online ordered items of dual-commerce available merchandise for sale or rent for a subsequent one or more first dual-commerce deliverable pickup fulfillments, a merchandise retail or rental return; and all merchandise deliverable movement paths of the pick-and-place apparatus and gripping device occur within the confines of the 360-degree deliverable fulfillment structure inaccessible to customers or passersby exterior to, and not-identified at, the ESA, and such that movement of dual-commerce available merchandise deliverables and movement paths of a deliverable fulfillment structure located outdoors adjacent, or separate from and near, to a merchandise DPNV, are not exposed to the elements.

126. The system of claim 100, wherein an online order for a plurality of dual-commerce available deliverables selected in a PWC device accessible software user interface associated with at least one DPNV, comprises:
- at least one dual-commerce available deliverable of at least one DPNV selected in an online order for a first dual-commerce deliverable pickup fulfillment; and
- at least one dual-commerce available deliverable of at least one DPNV selected online for a second dual-commerce deliverable fulfillment delivery; and
- an at least one networked-computer operative to facilitate dual-commerce deliverable ordering and fulfillments consolidates the orders for the different dual-commerce deliverable fulfillments into a single online order.

127. The system of claim 100, further comprising:
- a PWC device accessible software user interface associated with a retail merchandise DPNV and name of the DPNV, being operative to represent a current databased selection of merchandise comprising one or more retail dual-commerce available deliverable available for selection for the first dual-commerce deliverable fulfillment, the second the first dual-commerce deliverable fulfillment, or both; and
- facilitate a browsing and selecting of the merchandise, comprising one or more retail dual-commerce available deliverables, by one or more of:
  - product type(s), product(s) model, product(s) price, product(s) tax, product(s) currently available, product size(s), product dimension(s), product(s) shape, product(s) age, product(s) color.

128. The system of claim 100, further comprising an at least one networked-computer operative to represent in a PWC device accessible user interface associated with a DPNVs, at-venue deliverables and online deliverables available for selection for one or more of the first dual-commerce deliverable pickup fulfillments, or one or more of the second dual-commerce deliverable fulfillment deliveries, or both, via one or more of: instant messaging, email, text, digital video files, digital audio files, computer-storable files, photographs, faxes, graphical depictions, line art.

129. The system of claim 100, further comprising a networked-computer communicatively coupled with at least one database and databased venue-condition data, being operative to record at least one of:
- customer use of an ESA customer interface device and one or more of ESA transaction(s), ESA customer interaction(s) at one or more single venue facility DPNVs or multi-venue facility DPNVs; and
- online ordering of one or more deliverables of at least one DPNV, concurrent with each customer transaction.

130. The system of claim 100, further comprising:
- the upright portion of the exterior side of the deliverable fulfillment structure, located adjacent, facing and along a side or side portion of a designated ESA, wherein the ESA is of a given or scalable size and scheduled customer visit capacity;
- an upright portion of the deliverable fulfillment structure adjacent or proximate at least one of the laterally disposed merchandise reception bins further comprising at least one networked customer interface station or bay;
- the at least one customer interface station or bay comprising an at least one of the first plurality of customer interface devices operative to verify a customer identity, or an order pertaining to a first dual-commerce deliverable pickup fulfillment, or both; and,
- an at least one of the second plurality of customer interface devices operative to receive an at-venue payment pertaining to a deliverable pickup fulfillment, wherein at least one dual-commerce available merchandise deliverable selected in an order online and moved into a given merchandise reception bin, for a first dual-commerce deliverable pickup fulfillment, is made accessible to a respective identity confirmed customer following a received payment, within a specified ESA visit time-window.

131. The system of claim 130, wherein within a specified time-window, at least one of an at least first customer interface device operative to verify a customer identity, or order for a first dual-commerce deliverable pickup fulfillment, or both, at the networked customer interface station or bay and an at least one customer interface device operative to receive a payment at the customer interface station or bay for the order, and
- wherein the at least first customer interface device, or the at least one customer interface device, or both, comprise one or more of the following:
  - a networked-computer equipped with a display and graphical user interface, a computer-interfaced keyboard, a computer-interfaced keypad, a PIN entry device, an electronic-signature pad, a magnetic card-strip reader, a financial transaction card reader operative to read one or more of financial transaction card information, credit card information, membership card information, at least one device operative to communicate wirelessly with the PWC device of the customer at the ESA via one or more of infrared, Bluetooth, radio wave, frequencies or frequency ranges.

\* \* \* \* \*

UNITED STATES PATENT AND TRADEMARK OFFICE
CERTIFICATE OF CORRECTION

PATENT NO. : 11,682,027 B2
APPLICATION NO. : 12/262007
DATED : June 20, 2023
INVENTOR(S) : Darrell Metcalf Page 1 of 1

It is certified that error appears in the above-identified patent and that said Letters Patent is hereby corrected as shown below:

In the Claims

Column 27, Claim 34, Line 20, should read as follows:
34. The method of claim 1, further comprising: a multi-DPNV itinerary including a sequencing of ESA visits wherein each ESA visit is scheduled for a respective one of a plurality of DPNVs of different locations; sequencing each ESA visit at the multi-DPNV itinerary in a scheduled one of a plurality of distinct time-windows for a first dual commerce deliverable fulfillment at a designated ESA at a respective DPNV; determining by the at least one networked-computer each distinct time-window for a sequenced ESA visit at a respective DPNV, based at least in part on one or more online represented dual-commerce available deliverables of a respective DPNV being selected in an online order, and data pertaining to scheduled and schedulable ESA visits of the DPNVs; and presenting the multi-DPNV itinerary, in a GUI in a display at a GPS-equipped PWC device or GPS-equipped handheld PWC device at least in advance of an upcoming one at more of the sequenced ESA visits.

Column 49, Claim 97, Line 21, should read as follows:
97. The system of 68 further comprising a customer interface device at a designated ESA operable to receive a code, associated with a DPNV online order including a first dual-commerce deliverable fulfillment, and in response to the code being received by the customer interface device permit a customer of the DPNV online order an access at the designated ESA to the first dual-commerce deliverable fulfillment.

Signed and Sealed this
Nineteenth Day of September, 2023

Katherine Kelly Vidal
*Director of the United States Patent and Trademark Office*